United States Patent
Zhao et al.

(10) Patent No.: US 11,308,589 B2
(45) Date of Patent: Apr. 19, 2022

(54) DEVICES, SYSTEMS, AND METHODS FOR ENHANCING IMAGES

(71) Applicant: Canon Virginia, Inc., Newport News, VA (US)

(72) Inventors: Yunzhe Zhao, Irvine, CA (US); Bradley Scott Denney, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 102 days.

(21) Appl. No.: 16/400,972

(22) Filed: May 1, 2019

(65) Prior Publication Data

US 2019/0340733 A1    Nov. 7, 2019

Related U.S. Application Data

(60) Provisional application No. 62/812,571, filed on Mar. 1, 2019, provisional application No. 62/788,661, filed on Jan. 4, 2019, provisional application No. 62/666,600, filed on May 3, 2018.

(51) Int. Cl.
*G06T 5/00* (2006.01)
*G06T 5/50* (2006.01)

(52) U.S. Cl.
CPC .............. *G06T 5/008* (2013.01); *G06T 5/003* (2013.01); *G06T 5/009* (2013.01); *G06T 5/50* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2006/0291742 A1* | 12/2006 | Zhang | ..................... | G06T 5/009 382/266 |
| 2009/0034868 A1* | 2/2009 | Rempel | ................ | G09G 3/3426 382/264 |
| 2011/0194618 A1* | 8/2011 | Gish | ....................... | H04N 19/59 375/240.25 |
| 2012/0189208 A1* | 7/2012 | Inaba | ........................ | G06T 5/50 382/195 |
| 2014/0184916 A1* | 7/2014 | Steiner | ..................... | G06T 5/007 348/607 |
| 2014/0241642 A1* | 8/2014 | Seo | ........................... | G06T 5/002 382/260 |
| 2015/0312538 A1* | 10/2015 | Nashizawa | ............ | H04N 9/646 348/256 |

(Continued)

OTHER PUBLICATIONS

Laurence Meylan et al., A Model of Retinal Local Adaptation for the Tone Mapping of Color Filter Array Images, Optical Society of America, 2007.

(Continued)

*Primary Examiner* — Jianxun Yang
(74) *Attorney, Agent, or Firm* — Canon U.S.A., Inc. IP Division

(57) ABSTRACT

Devices, systems, and methods obtain an image; perform at least one nonlinear locally-adaptive mapping on the image, thereby generating a revised image; generate an edge-enhanced image based on the revised image; and perform dynamic contrast stretching on the edge-enhanced image, thereby generating an enhanced image.

18 Claims, 20 Drawing Sheets

(56) References Cited

U.S. PATENT DOCUMENTS

2016/0210717 A1* 7/2016 Adsumilli .......... H04N 1/32197

OTHER PUBLICATIONS

G. Eilertsen et al., A comparative review of tone-mapping algorithms for high dynamic range video, May 2017.
Wikipedia, Histogram equalization, Apr. 25, 2018, retrieved from https://en.wikipedia.org/w/index.php?title=Histogram_equalization&oldid=838156901.

* cited by examiner

DEVICES, SYSTEMS, AND METHODS FOR ENHANCING IMAGES

CROSS-REFERENCE TO RELATED APPLICATIONS

This application claims the benefit of U.S. Application No. 62/666,600, which was filed on May 3, 2018; of U.S. Application No. 62/788,661, which was filed on Jan. 4, 2019; and of U.S. Application No. 62/812,571, which was filed on Mar. 1, 2019.

BACKGROUND

Technical Field

This application generally concerns image enhancement.

Background

One approach to enhance an image's details (e.g., contrast, edges) is to convolve the image with an edge-enhancement filter, such as a Laplacian filter or a Laplacian of Gaussian filter, or to adjust the intensities of the pixels. Also, tone mapping can be used to map an input image that has limited dynamic range from one set of intensities to another set of intensities to approximate the appearance of a high-dynamic-range image.

SUMMARY

Some embodiments of a method comprise obtaining an image; performing at least one nonlinear locally-adaptive mapping on the image, thereby generating a revised image; generating an edge-enhanced image based on the revised image; and performing dynamic contrast stretching on the edge-enhanced image, thereby generating an enhanced image.

Some embodiments of a device comprise one or more computer-readable media storing instructions and one or more processors. And the one or more processors are configured to communicate with the one or more computer-readable media to execute the instructions to cause the device to perform operations that comprise obtaining an image; performing two or more nonlinear locally-adaptive mappings on the image, thereby generating a revised image; and generating an adjusted-dynamic-range image based on the revised image.

Some embodiments of one or more computer-readable storage media store instructions that, when executed by one or more computing devices, cause the one or more computing devices to perform operations that comprise obtaining an image; performing a first nonlinear locally-adaptive mapping on the image, thereby generating an interim image; and performing a second nonlinear locally-adaptive mapping on the image, thereby generating a revised image.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
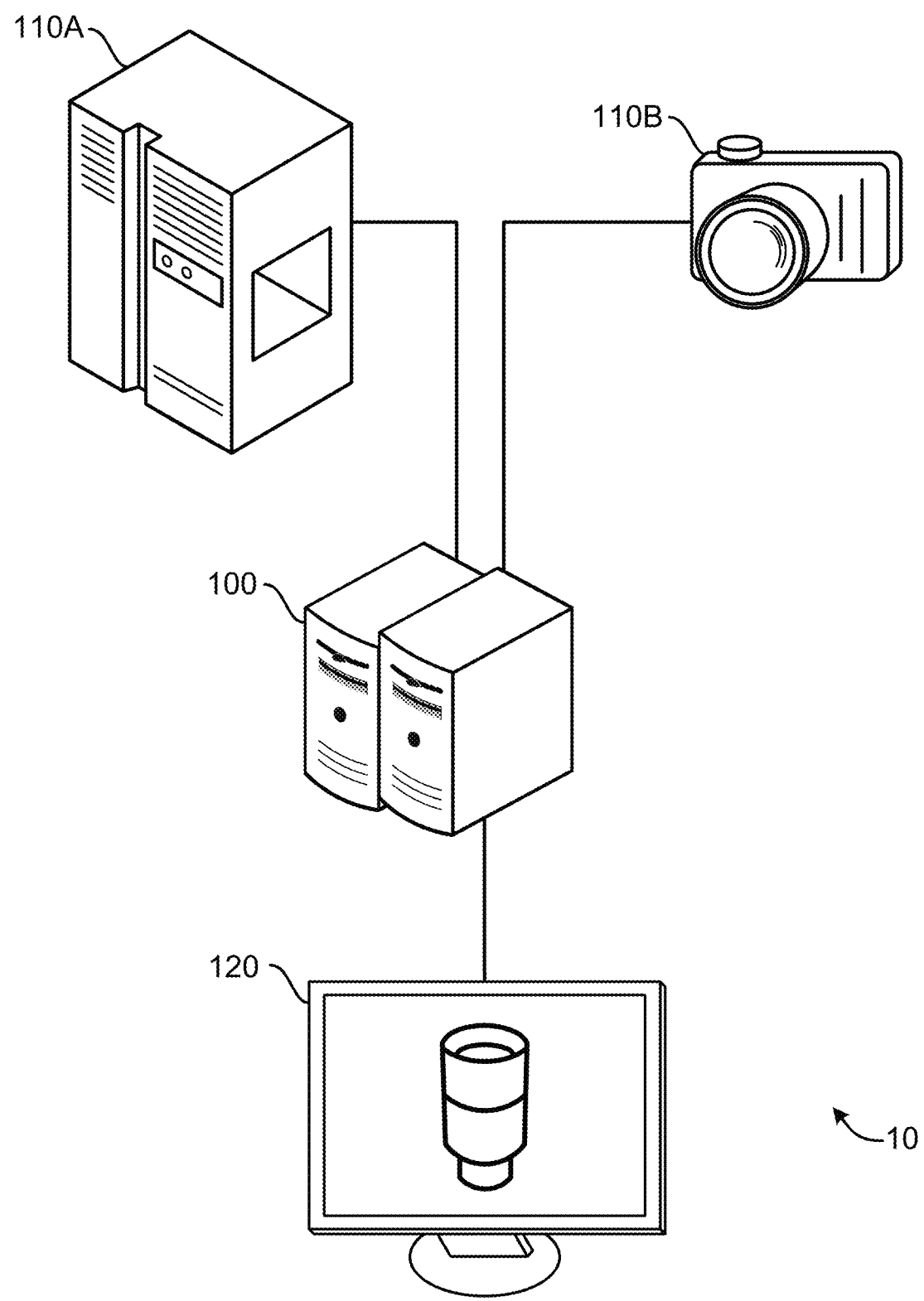
FIG. 1 illustrates an example embodiment of an image-enhancement system.

FIG. 1 illustrates an example embodiment of an image-enhancement system 10. The image-enhancement system 10 includes one or more image-enhancement devices 100, each of which is a specially-configured computing device (e.g., a specially-configured desktop computer, a specially-configured laptop computer, a specially-configured server); one or more image-capturing devices, such as an x-ray detector 110A or a camera 110B (collectively, the "image-capturing devices 110"); and at least one display device 120.

The image-capturing devices 110 capture images, and the one or more image-enhancement devices 100 obtain the images. The one or more image-enhancement devices 100 then enhance the images, and the one or more image-enhancement devices 100 may send the enhanced images to the display device 120, which displays the enhanced images.

To enhance the images, the one or more image-enhancement devices 100 may convolve the images with an edge-enhancement filter. But, because of the limitations of the image-capturing devices 110, the dynamic range of the display device 120, or the structure of the human vision system, some details in the images might barely be captured or be identified by the edge-enhancement filter, for example the details in an underexposed region or the details that lack sufficient local contrast. Re-distributing the pixel intensities may make some of these details more visible by using a global-mapping function, such as gamma correction or histogram equalization. In global mapping, for a pixel with a certain input value, the output value will be a known fixed value that is based on the mapping curve, regardless of the other pixels that surround the pixel. But global mapping may be less sensitive to local contrast and particularly may be less sensitive to local contrast than human eyes. So even the edge-enhancement filter may not be able to detect and enhance the details in these regions.

Some embodiments of the one or more image-enhancement devices 100 perform one or more nonlinear locally-adaptive mappings on the images and use the output of the one or more nonlinear locally-adaptive mappings as inputs to an edge-enhancement filter, which may increase the visible details in underexposed regions and low-contrast regions in the images. And some embodiments of the one or more image-enhancement devices 100 perform dynamic contrast stretching on the images, which may further enhance the details of the images.

Figure 2:
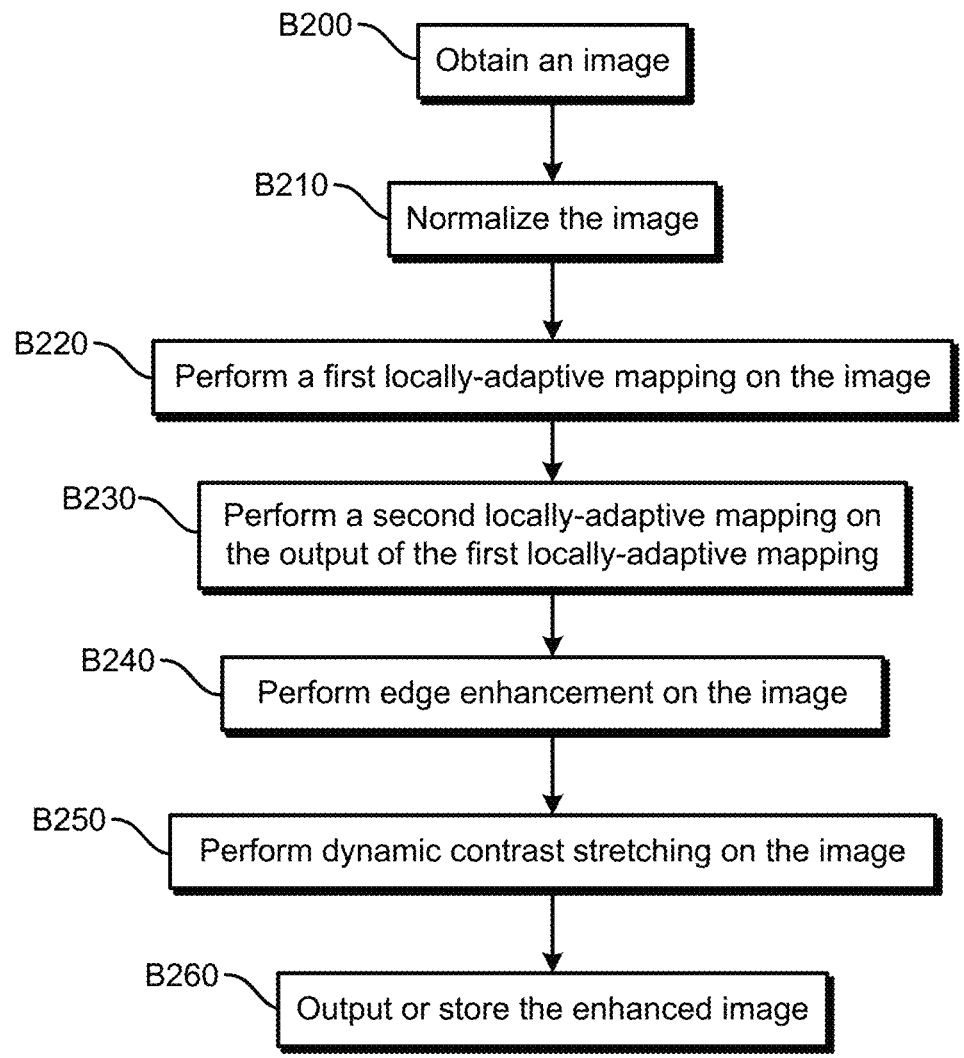
FIG. 2 illustrates an example embodiment of an operational flow for enhancing an image.

FIG. 2 illustrates an example embodiment of an operational flow for enhancing an image. Although this operational flow and the other operational flows that are described herein are presented in a certain order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations from more than one of the embodiments that are described herein. Thus, some embodiments of the operational flows may omit blocks, add blocks, change the order of the blocks, combine blocks, or divide blocks into more blocks relative to the example embodiments of the operational flows that are described herein.

Furthermore, although this operational flow and the other operational flows that are described herein are performed by an image-enhancement device, some embodiments of these operational flows are performed by two or more image-enhancement devices or by one or more other specially-configured computing devices.

The operational flow in FIG. 2 starts in block B200, wherein the image-enhancement device obtains an image (e.g., from an image-capturing device, from an image-repository device). Next, in block B210, the image-enhancement device normalizes the values of the pixels in the image, for example by normalizing them to [0,1]. Also, some embodiments do not include block B210.

The flow then moves to block B220, where the image-enhancement device performs a first locally-adaptive mapping (e.g., a first nonlinear locally-adaptive mapping) on the input image (the image that is input to block B220), for example the normalized image in embodiments that include block B210 or the image obtained in block B200 in embodiments that omit block B210. In some embodiments, the first locally-adaptive mapping of an input pixel x can be described by the following:

$$y_{temp} = (\max(I_{in}) + f + a1)\frac{x}{x + f + a1}, \quad (1)$$

$$\text{where } f = LP(x) + \frac{\text{mean}(I_{in})}{2},$$

where $I_{in}$ is the input image, where $\max(I_{in})$ is the maximum pixel value in the input image $I_{in}$, where $y_{temp}$ is the output pixel value of the first locally-adaptive mapping, where α1 is a factor to control the mapping strength (a strength-control parameter), and where LP(x) is the value at pixel x after the input image $I_{in}$ has been convolved with a low-pass filter. The smaller the strength-control parameter α1 is, the stronger the boosting will be on the low-intensity pixels and the stronger the compression will be on the high-intensity pixels. Examples of low-pass filters in LP(x) include a two-dimensional (2D) median filter, a two-dimensional (2D) mean filter, and a 2D Gaussian filter.

Equation (1) may be understood by comparing it to equation (2):

$$Y = \frac{X}{X + X0}. \quad (2)$$

Instead of having a fixed factor X0, equation (1) uses a factor (f+α1) that incorporates information from the entire input image (mean($I_{in}$)), information from the current pixel's (LP(x)) surrounding region (e.g., neighborhood), and a strength-control parameter (α1).

Figure 3:
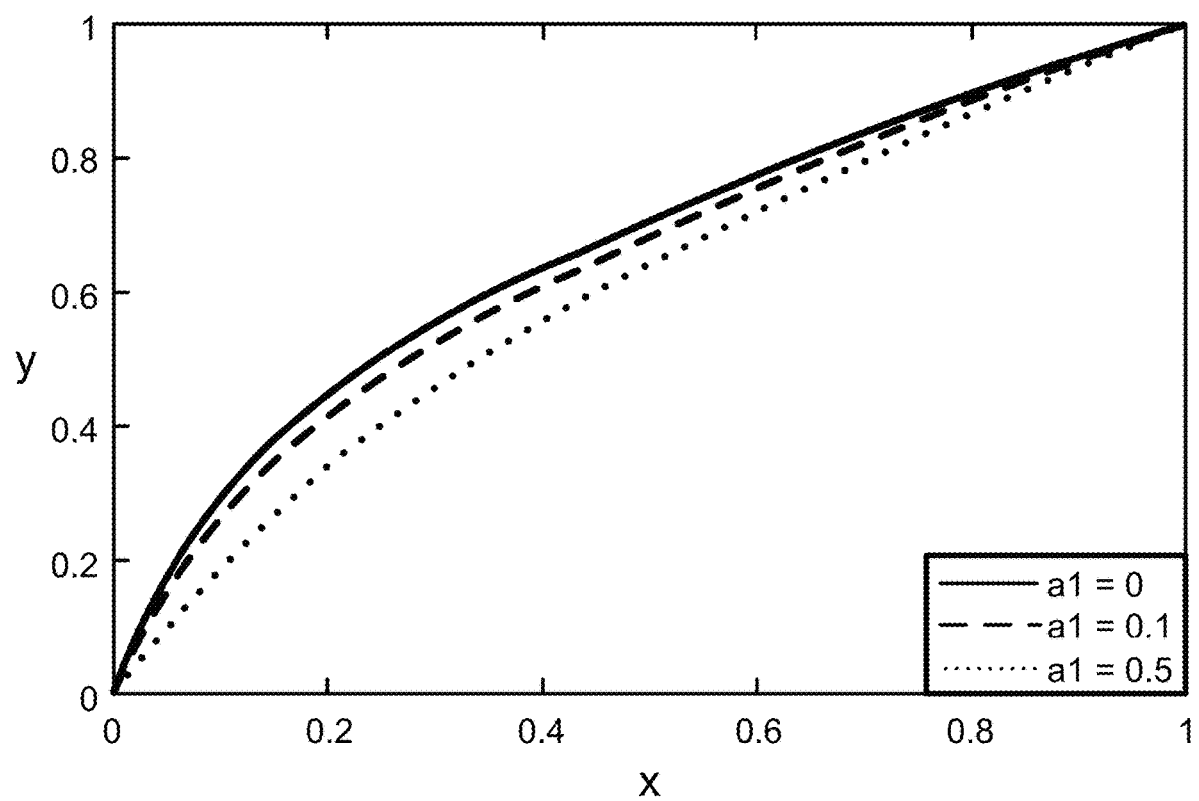
FIG. 3 illustrates example embodiments of mapping curves with different strength-control parameters.
Figure 4:
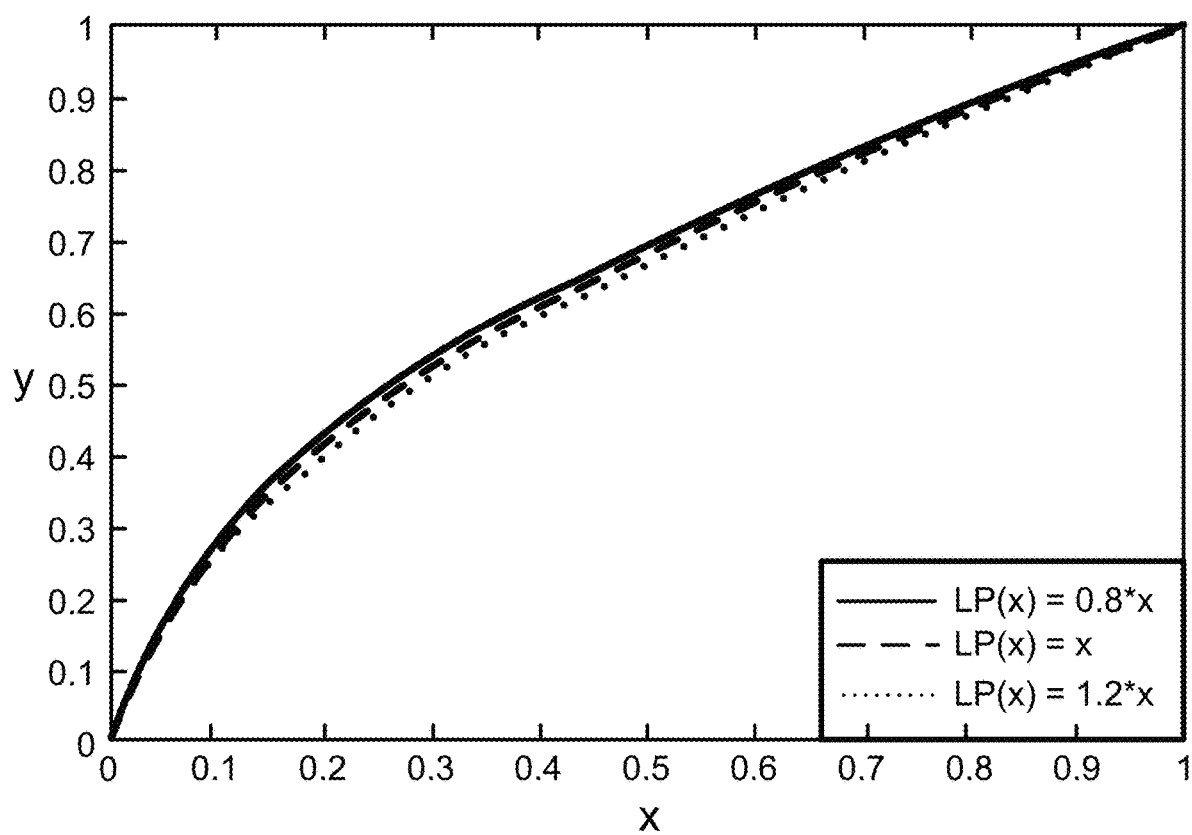
FIG. 4 illustrates example embodiments of mapping curves.

FIG. 3 illustrates example embodiments of mapping curves with different strength-control parameters. FIG. 3 shows mapping curves of equation (1) with different strength-control parameter (α1) values when mean(X)=0.5 and LP(x)=x. Also, FIG. 4 illustrates example embodiments of mapping curves. FIG. 4 shows mapping curves that have different surrounding regions when mean(X)=0.5 and α1=0.1. FIG. 4 indicates the following: (1) If the current pixel's value is higher than the values of the pixels in the surrounding neighborhoods, then more boosting will be performed; and (2) if the current pixel's value is lower than the values of the pixels in the surrounding neighborhoods, then less boosting will be performed. This operation may enhance the local contrast.

The operations in block B220 generate an interim image $Y_{temp}$ that is composed of the output pixel values of the first locally-adaptive mapping.

Next, in block B230, the image-enhancement device performs a second locally-adaptive mapping (e.g., a second nonlinear locally-adaptive mapping) on the interim image $Y_{temp}$. In some embodiments, the second locally-adaptive mapping of an input pixel $y_{temp}$ (a pixel that in an image that is input to block B230) can be described by the following:

$$y_{out} = (\max(Y_{temp}) + h + a2)\frac{y_{temp}}{y_{temp} + h + a2}, \quad (3)$$

$$\text{where } h = LP(y_{temp}) + \frac{\text{mean}(Y_{temp})}{2},$$

where $y_{out}$ is the output value of the pixel, where $Y_{temp}$ is the interim image ($Y_{temp}$ includes pixels $\{y_{temp_1}, y_{temp_2}, \ldots y_{temp_3}, \ldots \}$), where $\max(Y_{temp})$ is the maximum pixel value in the interim image $Y_{temp}$, where α2 is a strength-control parameter, and where LP($y_{temp}$) is the value at pixel x after the interim image $Y_{temp}$ has been convolved with a low-pass filter.

After the second locally-adaptive mapping, at least some of the pixels in the original image (the image obtained in block B200) have been mapped to new values based on the mean of the values of all the pixels in the image, on the values of the pixels in the region near the pixel, and on the respective pixel's original value. Underexposed pixels are boosted, overexposed pixels are compressed, and local contrast increases.

The flow then moves to block B240, where the image-enhancement device performs edge enhancement on the image that was output by block B230. For example, some embodiments of the image-enhancement device convolve the image with a Laplacian of Gaussian (LOG) 2D filter. In this embodiment, the Gaussian operator smoothes the noise while the Laplacian operator detects the edges in the image. In some embodiments, after block B240 is performed, the values of pixels that show the edges are zero or close to zero, while the values of the pixels in other areas in the image are below zero. Thus, the image-enhancement device may then normalize the image (e.g., to [0,1]) to give all the pixels respective non-negative values. Because the operations in blocks B220-230 may improve the local contrast in the image, they may also help the LOG filter better detect and amplify the details in the image.

Next, in block B250, the image-enhancement device performs dynamic contrast stretching on the image that is output by block B240, thereby generating an adjusted-dynamic-range image. When performing dynamic contrast stretching, some embodiments of the image-enhancement device calculate value L1 and value L2 such that t1 percent of the pixels in the whole image have values lower than L1 and such that t2 percent of the pixels in the whole image have values lower than L2. In some embodiments, a user can define t1 and t2, but t1 has to be smaller than t2. For example, in some embodiments, t1 is set to 1% while t2 is set to 95%. Then the dynamic-contrast-stretched image $X_{result}$ is generated, for example as described by equations (4), (5), and (6):

$$X_{filtered}(X_{filtered} < L1) = L1, \quad (4)$$

$$X_{filtered}(X_{filtered} > L2) = L2, \text{ and} \quad (5)$$

$$X_{result} = \frac{X - L1}{L2 - L1}, \quad (6)$$

where $X_{filtered}$ is the output of block B240.

Because L1 and L2 are calculated based on t1 and t2, the values may be dynamically changed for each image. Also, in this embodiment, the dynamic-contrast-stretched image $X_{result}$ is the enhanced image.

Finally, in block B260, the image-enhancement device outputs the enhanced image. The enhanced image may reveal more details both in underexposed regions as well as in the edges. Also, the contrast may be improved. Before output or storage, some embodiments scale the values to a different range for display or storage purposes, for example to [0,255]. Additionally, some embodiments of the operational flow use the output of block B220, the output of block B230, or the output of block B240 as the enhanced image.

Figure 5:
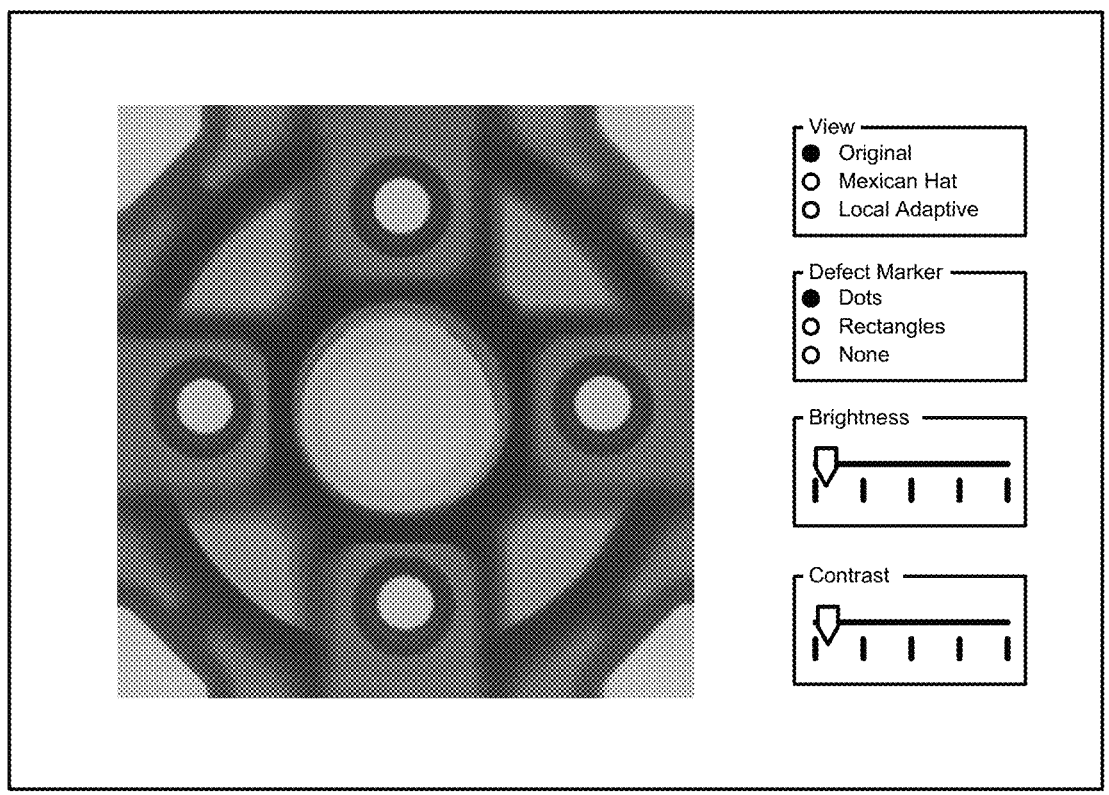
FIG. 5 illustrates an example embodiment of a user interface that displays an original image.
Figure 6:
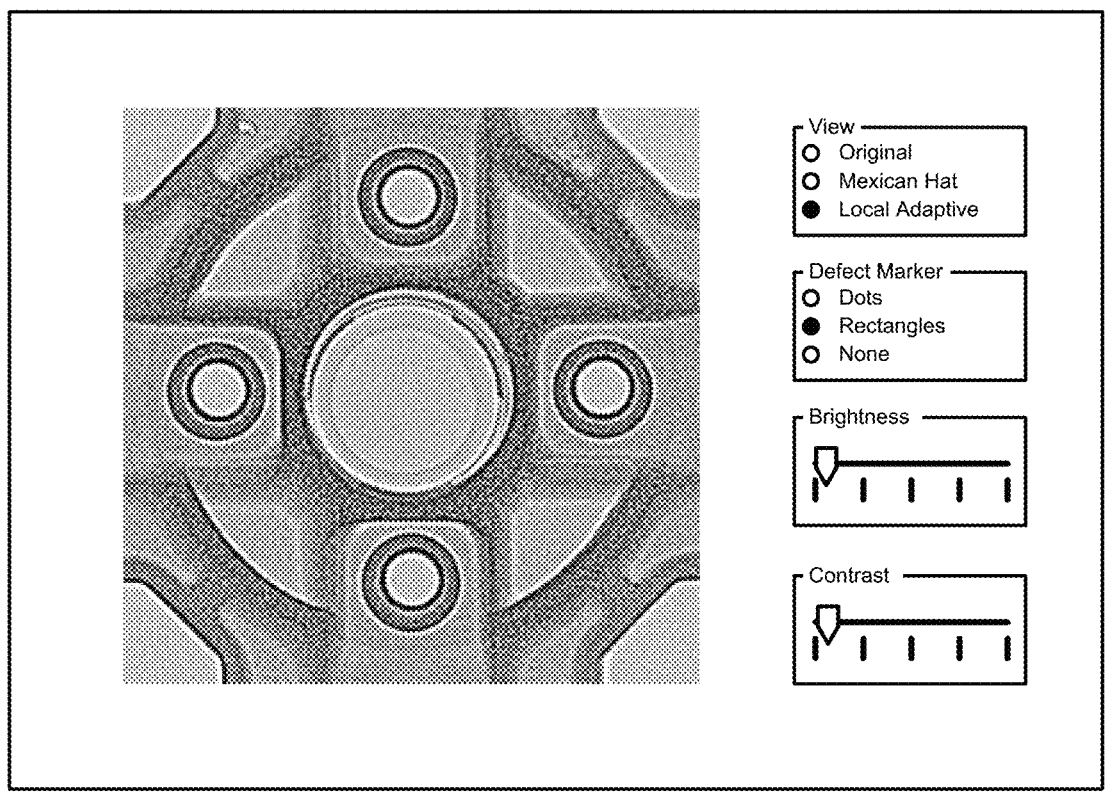
FIG. 6 illustrates an example embodiment of a user interface that displays an enhanced image.

FIG. 5 illustrates an example embodiment of a user interface that displays an original image, and FIG. 6 illustrates an example embodiment of a user interface that displays an enhanced image.

The enhanced image may have a contrast that has been increased, relative to the original image, and both globally and locally, to make more details visible to a human viewer. Also, the LOG filter may be able to detect more details and edges after the local contrast has been modified (e.g., enhanced) by one or more nonlinear locally-adaptive mappings. And an image may be enhanced pixel by pixel, and the enhancement's strength may be calculated to fit each pixel's respective location in the image.

Accordingly, some embodiments of the operational flow combine locally-adaptive mapping, a LOG filter, and dynamic contrast stretching to enhance contrast in an image. And some embodiments of the operational flow calculate a mapping factor for each pixel based on the image, on the region surrounding the pixel, and on the pixel's value. Furthermore, some embodiments of the operational flow convolve the locally-adaptive-mapped image with a LOG filter for further detail enhancement. Moreover, the strength of the contrast stretching may be calculated as a percentage and may vary from image to image.

Figure 7:
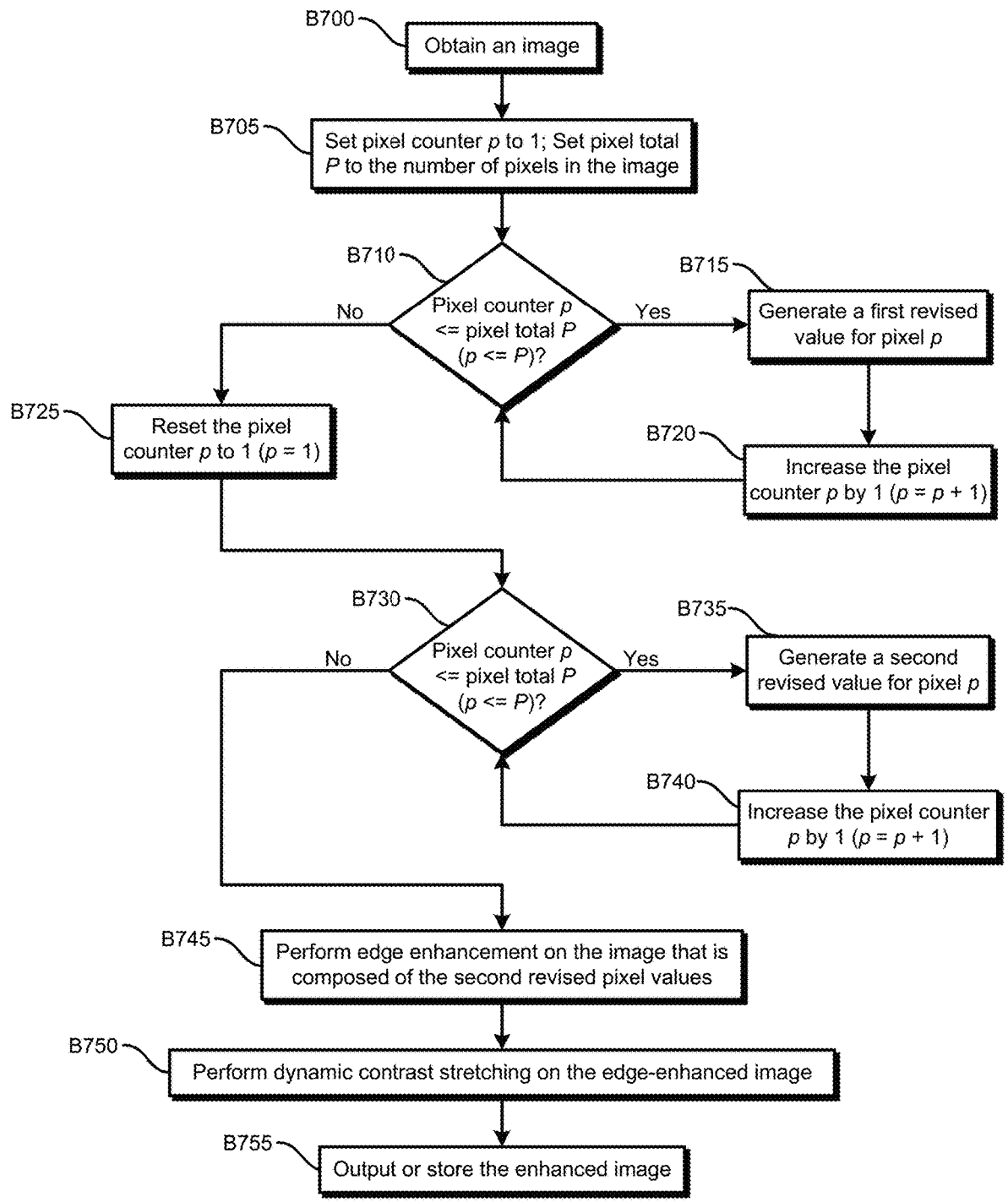
FIG. 7 illustrates an example embodiment of an operational flow for enhancing an image.

FIG. 7 illustrates an example embodiment of an operational flow for enhancing an image. The operational flow starts in block B700, where an image-enhancement device obtains an image (e.g., from an image-capturing device, from an image-repository device). The image-enhancement device may also normalize the image. Next, in block B705, the image-enhancement device sets a pixel counter p to one and sets a pixel total P to the total number of pixels in the image. The flow then moves to block B710.

In block B710, the image-enhancement device determines if the pixel counter p is less than or equal to the pixel total P. If yes (block B710=Yes), then the flow proceeds to block B715. In block B715, the image-enhancement device generates (e.g., calculates) a first revised value for pixel p based on some or all of the following: the value of pixel p, a strength-control parameter, the values of the pixels in the neighborhood of pixel p, the maximum pixel value in the image, and the central tendency (e.g., mean, median) of all the pixel values in the image. Some embodiments of block B715 can be described by equation (1). The first revised value for pixel p is added to an interim image.

The flow then moves to block B720, where the image-enhancement device increases the pixel counter p by one, and then the flow returns to block B710.

If in block B710 the image-enhancement device determines that the pixel counter p is not less than or equal to the pixel total P (block B710=No), then the flow proceeds to block B725. In block B725, the image-enhancement device resets the pixel counter p to one.

The flow then moves to block B730, where the image-enhancement device determines if the pixel counter p is less than or equal to the pixel total P. If yes (block B730=Yes), then the flow proceeds to block B735. In block B735, the image-enhancement device generates (e.g., calculates) a second revised value for pixel p based on some or all of the following: the first revised value of pixel p (in the interim image), a strength-control parameter (which may or may not be the same as the strength-control parameter in block B715), the values of the pixels in the neighborhood of pixel p in the interim image, the maximum pixel value in the interim image, and the central tendency (e.g., mean, median) of all the first revised pixel values in the interim image. Some embodiments of block B735 can be described by equation (3).

The flow then moves to block B740, where the image-enhancement device increases the pixel counter p by one, and then the flow returns to block B730.

If in block B730 the image-enhancement device determines that the pixel counter p is not less than or equal to the pixel total P (block B730=No), then the flow proceeds to block B745.

In block B745, the image-enhancement device performs edge enhancement on the image that is composed of the second revised pixel values (the output of block B740). Next, in block B750, the image-enhancement device performs dynamic contrast stretching on the edge-enhanced image (the output of block B745), thereby generating an adjusted-dynamic-range image. Also, in this embodiment, the adjusted-dynamic-range image is the enhanced image. Finally, in block B755, the image-enhancement device outputs (e.g., to a display device) or stores the enhanced image (the output of block B750). Additionally, some embodiments of the operational flow use the output of blocks B710-B720, the output of blocks B725-B740, or the output of block B745 as the enhanced image.

Figure 8:
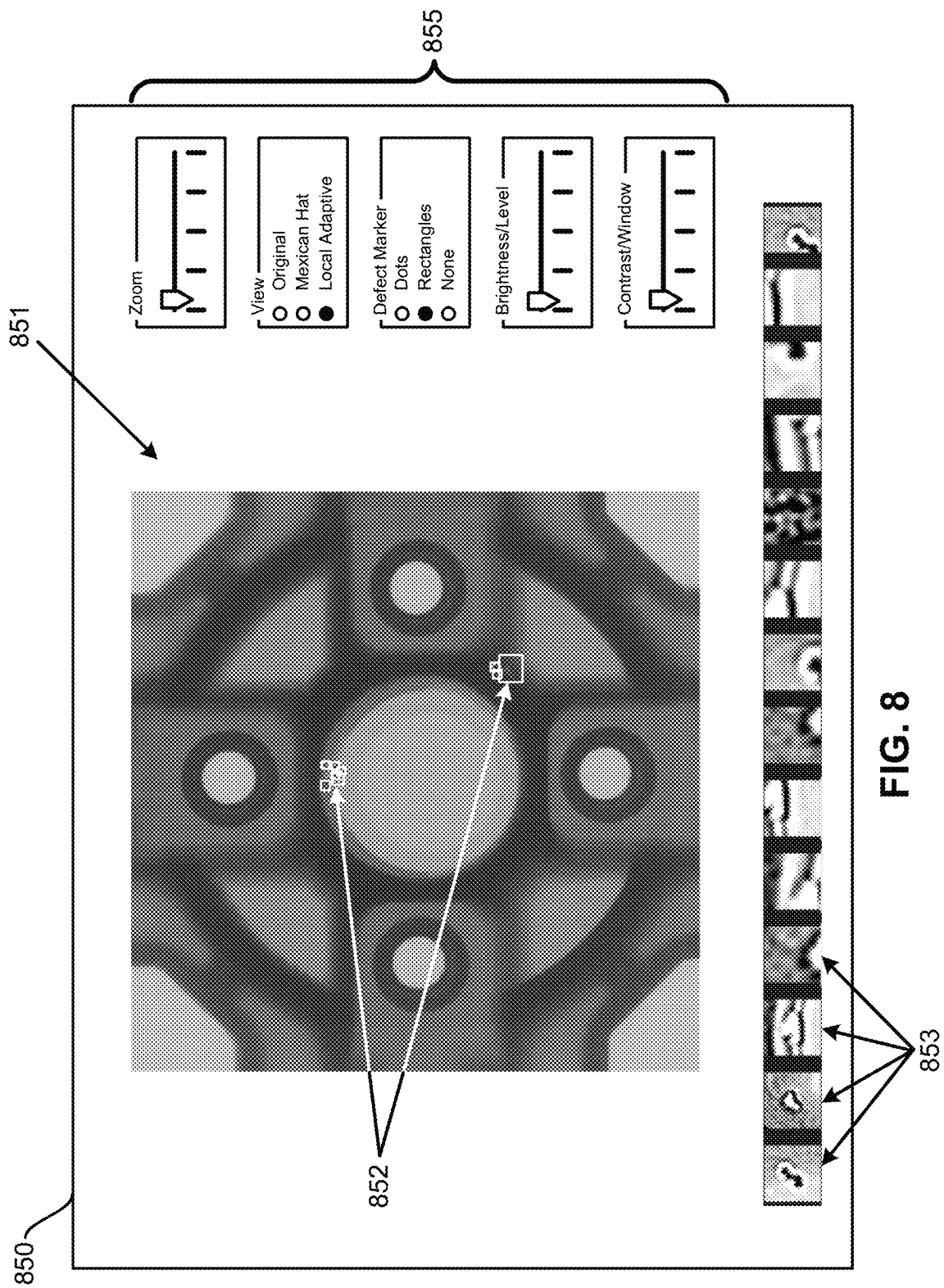
FIG. 8 illustrates an example embodiment of a user interface.

FIG. 8 illustrates an example embodiment of a user interface. The user interface 850 displays an image 851. In this embodiment, the image 851 is not an enhanced image. The user interface 850 also includes defect highlights 852, which show where potential defects have been detected in the image 851. The highlight thumbnails 853 show zoomed-in views of the areas in the image that include the potential defects. In this embodiment, although the image 851 is not an enhanced image, the highlight thumbnails 853 show views of the areas from a corresponding enhanced image of the image 851. In some embodiments, the user can click on a highlight thumbnail 853 to cause the user interface 850 to zoom in to the area in the image 851 that includes the highlight thumbnail 853. The user interface 850 also includes other controls 855 that allow a user to adjust aspects of the interface (e.g., zoom, cursor mode, marker type, view type).

Figure 9:
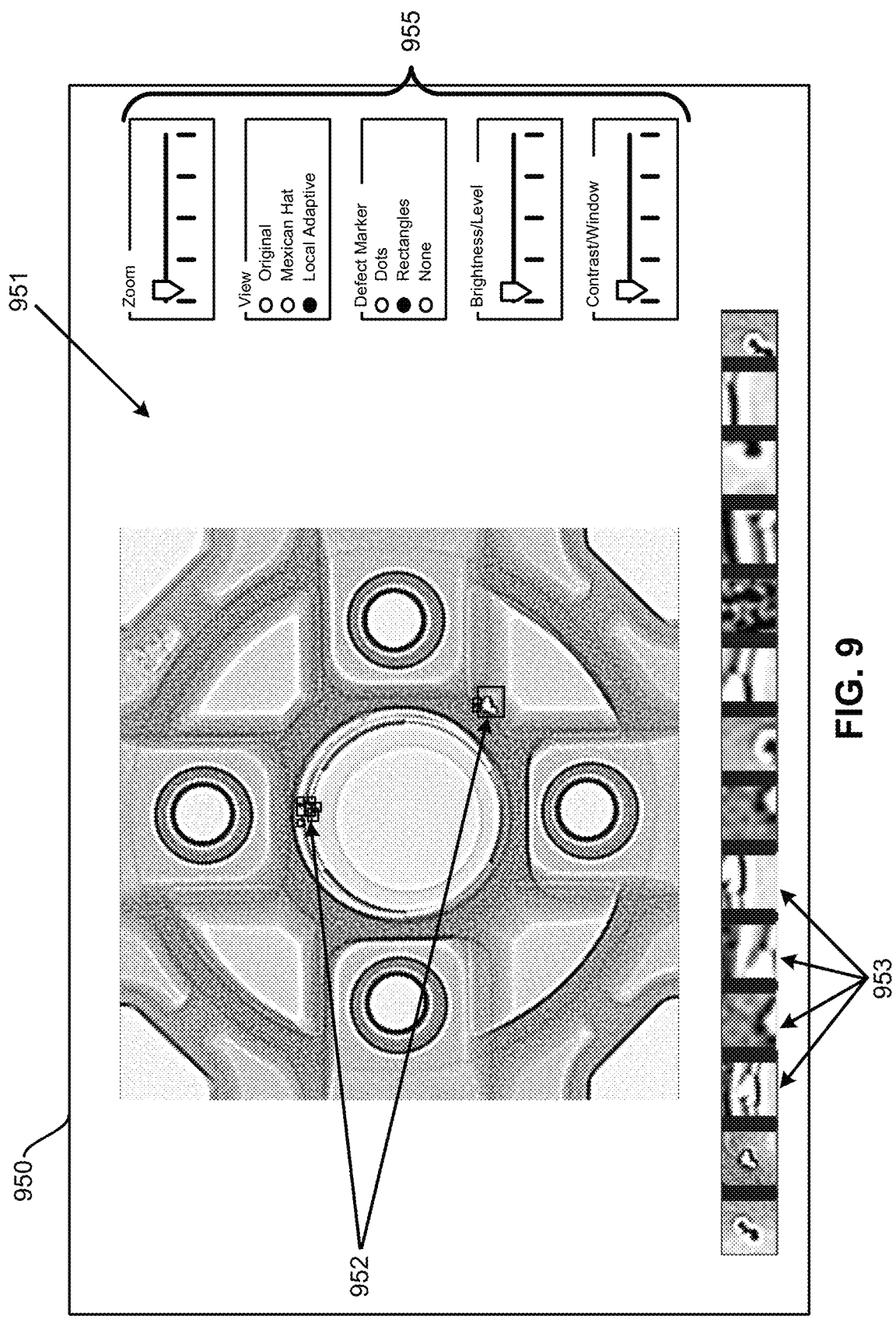
FIG. 9 illustrates an example embodiment of a user interface.

FIG. 9 illustrates an example embodiment of a user interface. The user interface 950 displays an image 951. In this embodiment, the image 951 is an enhanced image. The user interface 950 also includes defect highlights 952, which show where potential defects have been detected in the image 951. The highlight thumbnails 953 show zoomed-in views of the areas in the enhanced image 951 that include the potential defects. In this embodiment, the highlight thumbnails 953 show views of the areas from the enhanced image 951. In some embodiments, the user can click on (or otherwise active) a highlight thumbnail 953 to cause the user interface 950 to zoom in to the area in the enhanced image 951 that includes the highlight thumbnail 953. The user interface 950 also includes other controls 955 that allow a user to adjust aspects of the display (e.g., zoom, cursor mode, marker type, view type).

Figure 10:
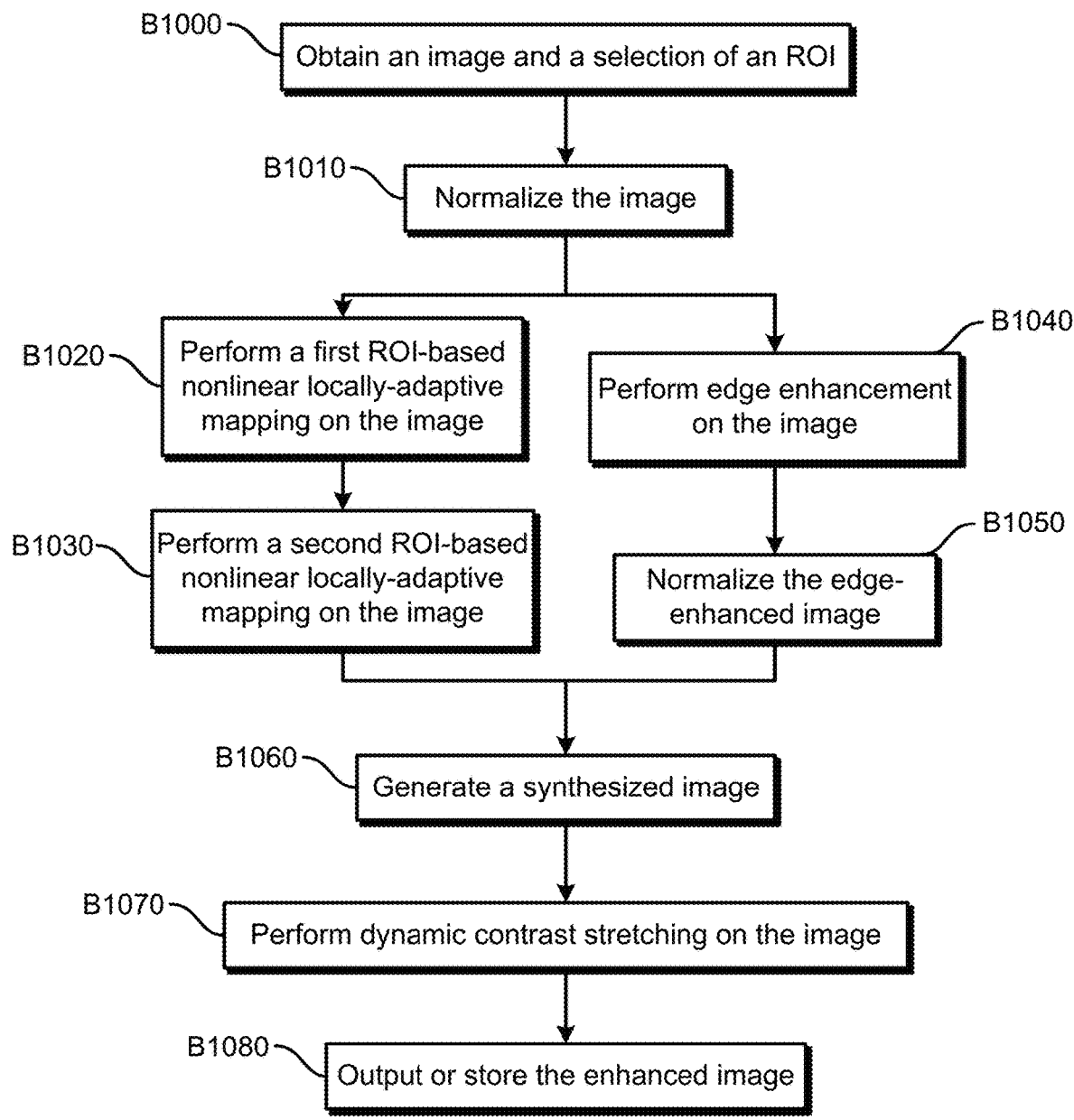
FIG. 10 illustrates an example embodiment of an operational flow for enhancing an image.

FIG. 10 illustrates an example embodiment of an operational flow for enhancing an image. This example embodiment of an operational flow performs a locally-adaptive tone mapping that emphasizes a Region-of-Interest (ROI).

The operational flow in FIG. 10 starts in block B1000, wherein an image-enhancement device obtains an image and a selection of an ROI. For example, the selection of the ROI may be received from a user via an input device, the selection of the ROI may be received from another computing device, and the selection of the ROI may be generated by the image-enhancement device. Next, in block B1010, the image-enhancement device normalizes the values of the pixels in the obtained image, for example by normalizing them to [0,1]. Also, some embodiments of the operational flow do not include block B1010.

Figure 11:
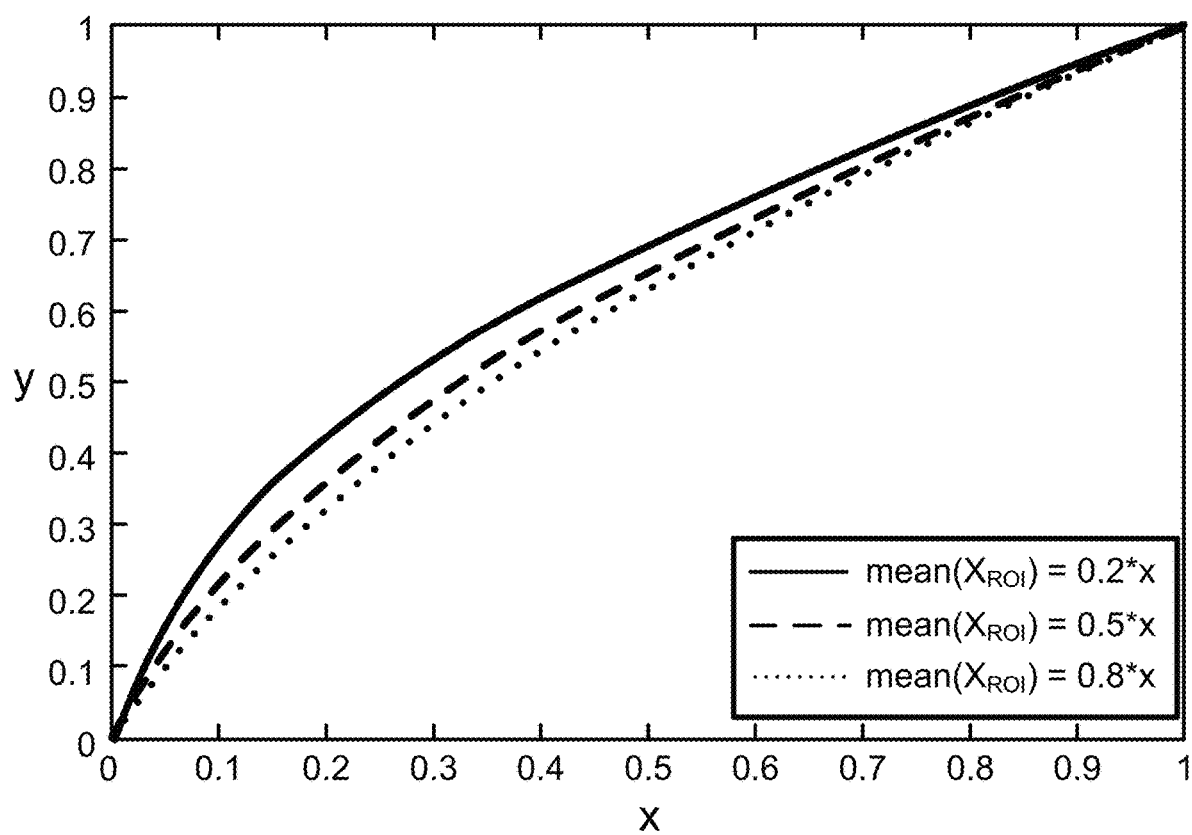
FIG. 11 illustrates example embodiments of mapping curves that show the effects of the mean value of a Region of Interest.

The flow then splits into a first flow and a second flow. The first flow moves to block B1020, where the image-enhancement device performs a first ROI-based locally-adaptive mapping (e.g., a nonlinear locally-adaptive mapping) on the pixels of the normalized image (or the obtained image in embodiments that omit block B1010). Some embodiments of the first ROI-based locally-adaptive mapping of an input pixel x can be described by the following:

$$y_{temp} = (\max(I_{in}) + f + a1)\frac{x}{x + f + a1}, \quad (7)$$

where $f = LP(x) + \text{mean}(I_{ROI})$, where $I_{in}$ is the input image (the image that is input to block B1020), where $y_{temp}$ is the output pixel value of the first ROI-based locally-adaptive mapping, where α1 is a strength-control parameter, where LP(x) is the value at pixel x after the input image has been convolved with a low-pass filter, and where $I_{ROI}$ is the ROI in the input image. For example, in some embodiments, the value of LP(x) is the weighted average value of all the pixels in the neighborhood of pixel x. Also, the mean value of the ROI (mean($I_{ROI}$)) operates as a baseline for the overall mapping curve. The larger the mean value of the ROI (mean($I_{ROI}$)) is, the brighter the ROI is, and the mapping curve will have less compression in the high-intensity pixels to preserve more details in the ROI. When the mean value of the ROI (mean($I_{ROI}$)) is smaller, the ROI region contains more lower-intensity pixels, and the mapping curve will have more boosting in the lower-intensity pixels to reveal more details in the ROI. FIG. 11 illustrates example embodiments of mapping curves that shows the effects of the mean value of the ROI (mean($I_{ROI}$)) in equation (7). In the mapping curves in FIG. 11, LP(x)=x and α1=0.1.

Additionally, unlike the fixed factor X0 in equation (2), equation (7) uses a factor (f+α1) that incorporates information from the current pixel x, information from a ROI (mean($I_{ROI}$)), information from a surrounding region of the current pixel (LP(x)), and a strength-control parameter α1. Also, equation (7) incorporates information from the whole image (max($I_{in}$)).

Figure 12:
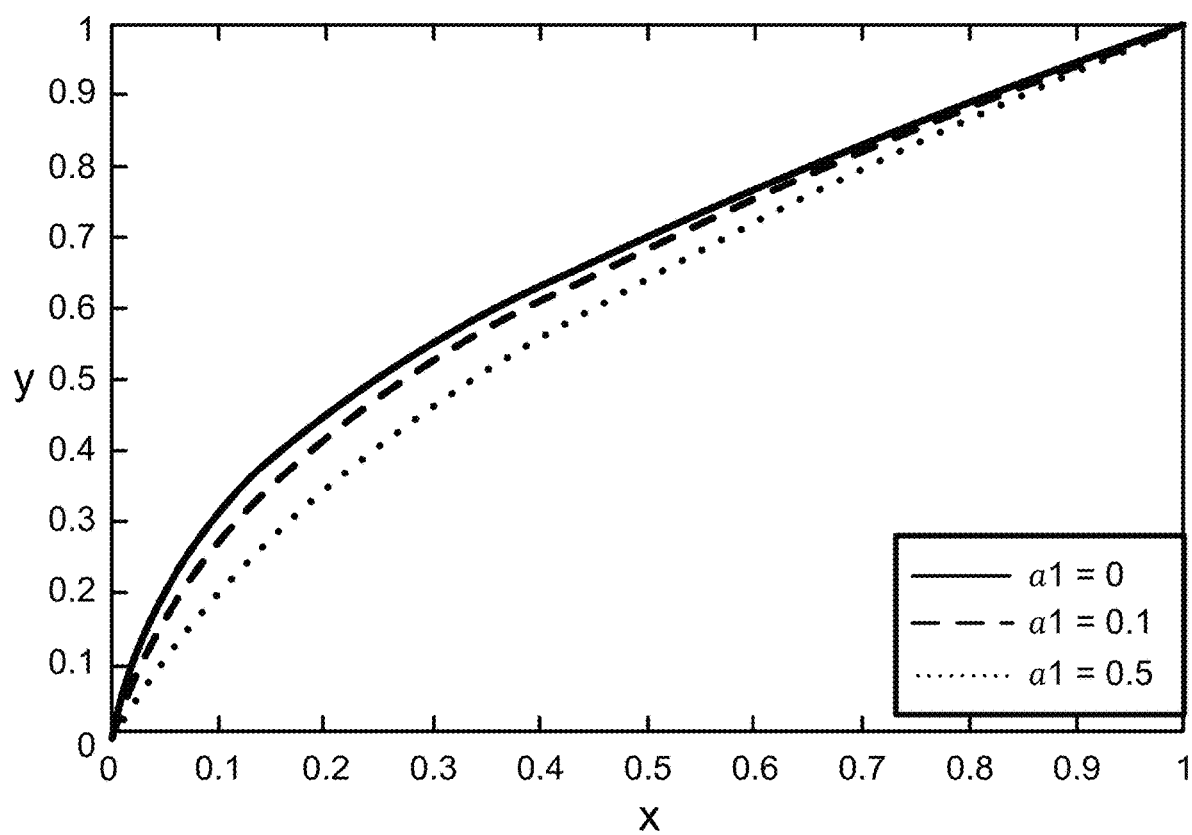
FIG. 12 illustrates an example embodiment of a mapping curve that shows the effects of a strength-control parameter.

FIG. 12 illustrates example embodiments of mapping curves that show the effects of the strength-control parameter a1 in equation (7). In the mapping curves in FIG. 12, LP(x)=x and mean($I_{ROI}$)=0.5.

Figure 13:
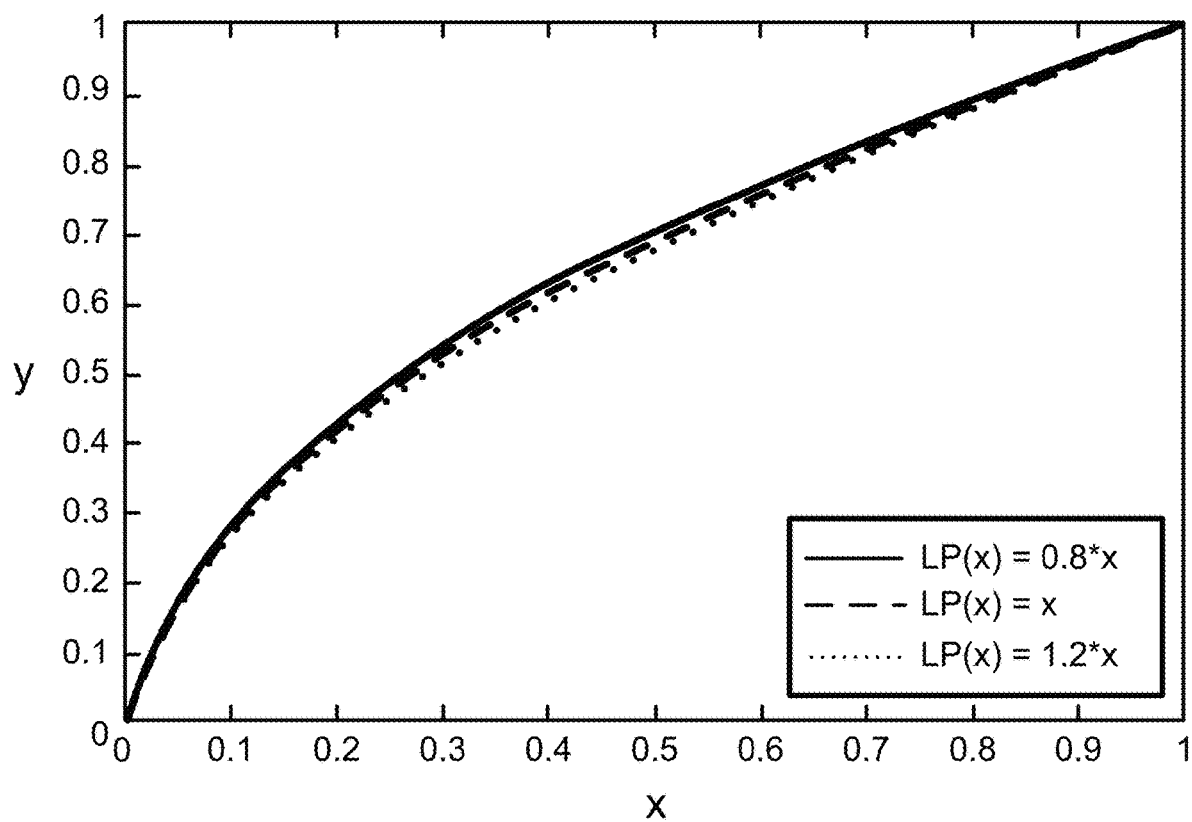
FIG. 13 illustrates an example embodiment of a mapping curve.

Also, FIG. 13 illustrates example embodiments of mapping curves. FIG. 13 illustrates mapping curves that are based on different surrounding regions LP(x), where mean ($I_{ROI}$)=0.5 and α1=0.1. FIG. 13 shows the following: (1) If the current pixel's value is higher than the values of the pixels in the surrounding neighborhood (or neighborhoods), then more boosting will be performed; and (2) if the current pixel's value is lower than the values of the pixels in the surrounding neighborhood (or neighborhoods), then less boosting will be performed (less boosting may increase the local contrast). The operations in block B1020 may enhance the local contrast.

The operations in block B1020 generate an interim image $Y_{temp}$ that is composed of the output pixel values of the first ROI-based locally-adaptive mapping.

Next, in block B1030, the image-enhancement device performs a second ROI-based locally-adaptive mapping (e.g., a nonlinear locally-adaptive mapping) on the interim image $Y_{temp}$. Some embodiments of the second ROI-based locally-adaptive mapping can be described by the following:

$$y_{out} = (\max(Y_{temp}) + h + a2)\frac{y_{temp}}{y_{temp} + h + a2}, \quad (8)$$

-continued $$\text{where } h = LP(y_{temp}) + \frac{\text{mean}(Y_{temp\_ROI})}{2},$$

where $Y_{temp}$ is the interim image (an image that was output by block B1020), where $y_{temp}$ is a pixel's value in $Y_{temp}$, where $y_{out}$ is the output value of the pixel, where $LP(y_{temp})$ is the value at pixel x after the interim image $Y_{temp}$ has been convolved with a low-pass filter, and where $Y_{temp\_ROI}$ is the ROI in $Y_{temp}$.

After the second ROI-based locally-adaptive mapping, each pixel value in the original image will have been mapped to a new pixel value based on the maximum pixel value in the entire image, on the mean pixel value in the ROI, on the values of the pixels in the region near the pixel (the surrounding region), and on the pixel's original value. Underexposed pixels are boosted, overexposed pixels are compressed, and local contrast increases. The first flow then moves to block B1060.

Also, from block B1010, the second flow moves to block B1040, where the image-enhancement device performs edge enhancement on the image that was output by block B1010 (or on the image that was obtained in block B1000 in embodiments that omit block B1010). For example, some embodiments of the image-enhancement device convolve the image with a Laplacian of Gaussian (LOG) 2D filter. After block B1040 is performed, the values of pixels away from any edges are closer to zero, while the values of pixels around the edges are more different from each other (e.g., occupy a greater range).

Next, in block B1050, the image-enhancement device normalizes the image that was output block B1040 (e.g., to [0,1]), for example to give all the pixels respective non-negative values in some embodiments. The second flow then moves to block B1060.

The output of block B1030 has an enhanced local contrast relative to the image that was obtained in block B1000, especially in the ROI, and the output of block B1050 has enhanced high-frequency details relative to the image that was obtained in block B1000.

In block B1060, the image-enhancement device generates (e.g., constructs) a synthesized image using the outputs of blocks B1030 and B1050. In some embodiments, the synthesizing can be described by the following:

$$X_r = (1-a) * y_{out} + a * y_{LOG}, \quad (9)$$

where $X_r$ is the synthesized image, where $y_{out}$ is the output of block B1030, where $y_{LOG}$ is the output of block B1050, and where a is a parameter that controls the strength of detail enhancement. The larger a is, the stronger the effects of the edge enhancement will be.

In block B1070, the image-enhancement device performs dynamic contrast stretching on the synthesized image that is output by block B1060, thereby generating an adjusted-dynamic-range image. When performing dynamic contrast stretching, some embodiments of the image-enhancement device calculate value L1 and value L2 such that t1 percent of the pixels in the whole image have values lower than L1 and t2 percent of the pixels in the whole image have values lower than L2. In some embodiments, a user can define t1 and t2, but t1 has to be smaller than t2. For example, in some embodiments, t1 is set to 3% while t2 is set to 98%. Then the adjusted-dynamic-range image is generated, for example as described by equations (10), (11), and (12):

$$X_r(X_r < L1) = L1, \quad (10)$$

$$X_r(X_r > L2) = L2, \text{ and} \quad (11)$$

$$X_{final} = \frac{X_r - L1}{L2 - L1}. \quad (12)$$

where $X_{final}$ is the adjusted-dynamic-range image (the enhanced image, in some embodiments), and where $X_r$ is the synthesized image.

Because L1 and L2 are calculated based on t1 and t2, the values may be dynamically changed for each image.

Figure 14A:
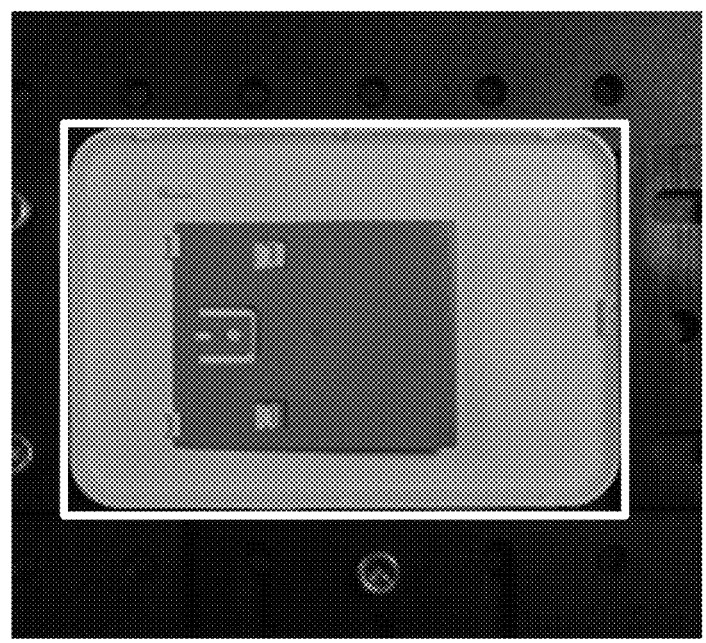
FIGS. 14A and 14B illustrate example embodiments of an input image and an enhanced image.
Figure 14B:
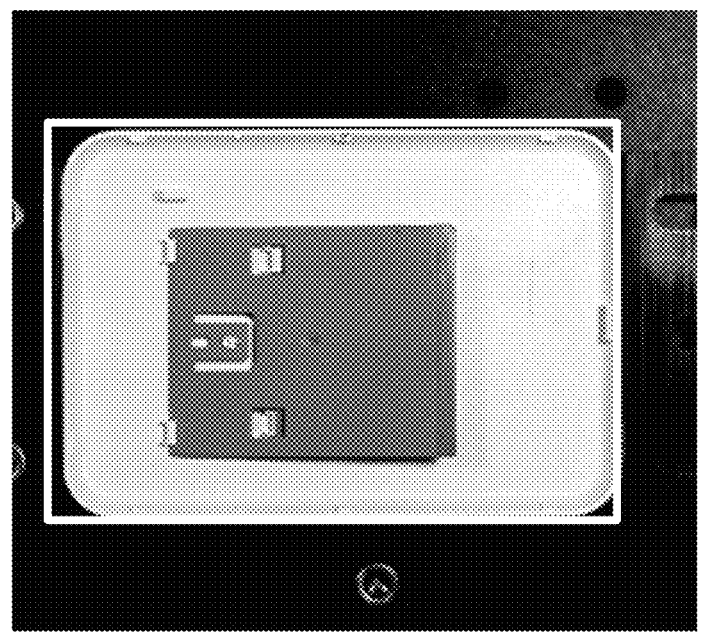

After the local contrast enhancement, the detail enhancement, the image synthesis, and the dynamic contrast stretching, the enhanced image may reveal more details (e.g., details in underexposure regions, edges) and may provide a more visually-appealing image of the ROI. FIGS. 14A and 14B illustrate example embodiments of an input image (an image obtained in block B1000) in FIG. 14A and an enhanced image in FIG. 14B. The white rectangles mark the ROI in the images.

Finally, in block B1080, the image-enhancement device outputs or stores the enhanced image. The enhanced image may reveal more details both in underexposed regions as well as in the edges. Also, the contrast may be improved relative to the input image. Before output or storage, some embodiments scale the pixel values to a different range for display or storage purposes, for example to [0,255]. Additionally, some embodiments of the operational flow use the output of block B1020, the output of block B1030, or the output of block B1060 as the enhanced image.

Figure 15:
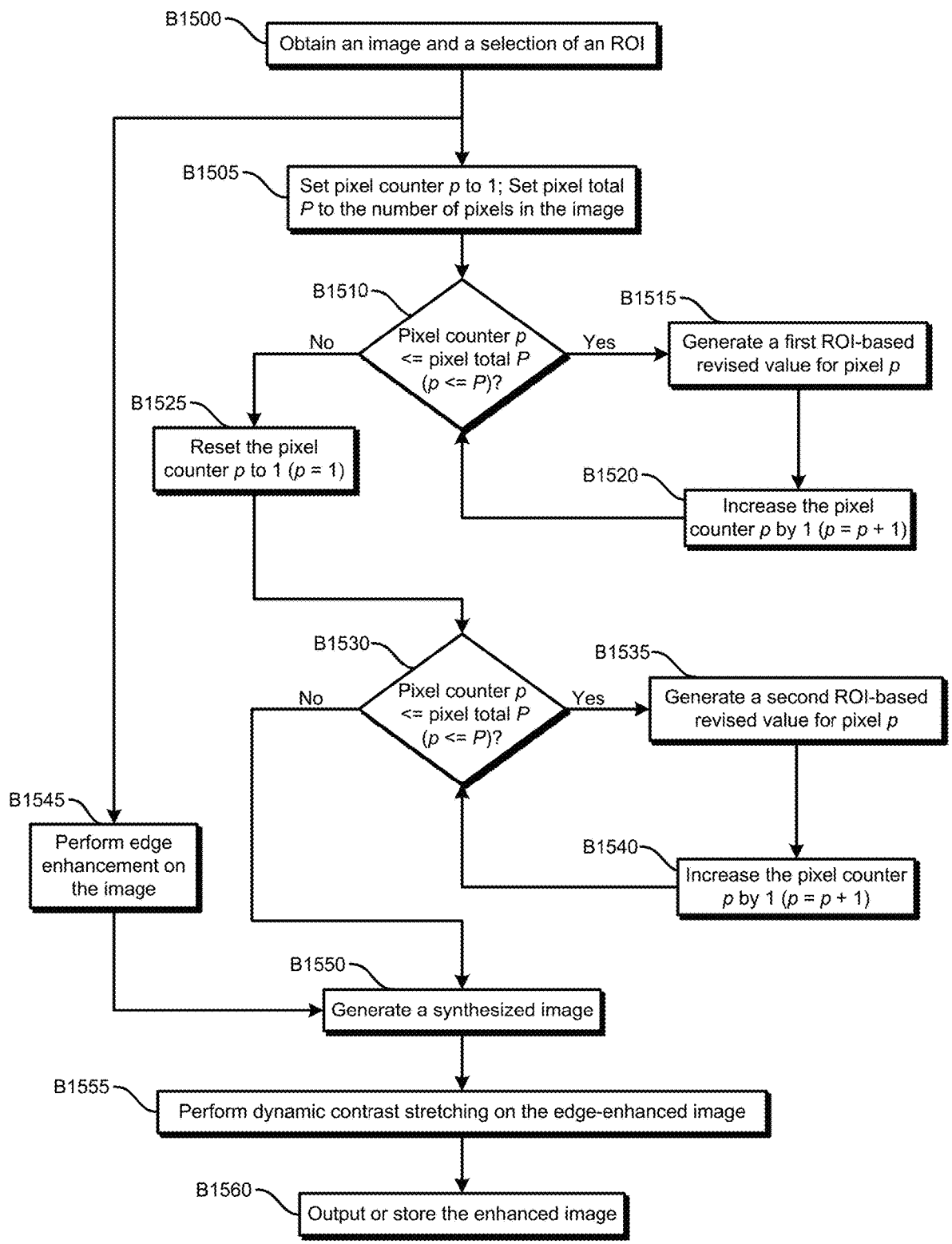
FIG. 15 illustrates an example embodiment of an operational flow for enhancing an image.

FIG. 15 illustrates an example embodiment of an operational flow for enhancing an image. The operational flow starts in block B1500, where an image-enhancement device obtains an image and a selection of a ROI (e.g., from an image-capturing device, from an image server). The image-enhancement device may also normalize the obtained image. The operational flow then splits into a first flow and a second flow.

The first flow proceeds to block B1505, where the image-enhancement device sets a pixel counter p to one and sets a pixel total P to the total number of pixels in the image. The first flow then moves to block B1510.

In block B1510, the image-enhancement device determines whether the pixel counter p is less than or equal to the pixel total P. If yes (block B1510=Yes), then the first flow proceeds to block B1515. In block B1515, the image-enhancement device generates (e.g., calculates) a first ROI-based revised value for pixel p based on some or all of the following: the value of pixel p, a strength-control parameter, the values of the pixels in the neighborhood of pixel p, the maximum pixel value in the obtained image, and a central tendency (e.g., mean, median) of the values of all the pixels in the ROI. Some embodiments of block B1515 can be described by equation (7). The image-enhancement device adds the first ROI-based revised value for pixel p to an interim image.

The first flow then moves to block B1520, where the image-enhancement device increases the pixel counter p by one, and then the first flow returns to block B1510.

If in block B1510 the image-enhancement device determines that the pixel counter p is not less than or equal to the pixel total P (block B1510=No), then the first flow proceeds to block B1525. In block B1525, the image-enhancement device resets the pixel counter p to one.

The first flow then moves to block B1530, where the image-enhancement device determines if the pixel counter p is less than or equal to the pixel total P. If yes (block B1530=Yes), then the first flow proceeds to block B1535. In block B1535, the image-enhancement device generates (e.g., calculates) a second ROI-based revised value for pixel p based on some or all of the following: the first ROI-based revised value of pixel p (the value of pixel p in the interim image), a strength-control parameter (which may or may not be the same as the strength-control parameter in block B1515), the values of the pixels in the neighborhood of pixel p in the interim image, the maximum of the values of all the pixels in the interim image, and a central tendency (e.g., mean, median) of the values of all the pixels in the ROI in the interim image. Some embodiments of block B1535 can be described by equation (8).

The first flow then moves to block B1540, where the image-enhancement device increases the pixel counter p by one, and then the first flow returns to block B1530.

If in block B1530 the image-enhancement device determines that the pixel counter p is not less than or equal to the pixel total P (block B1530=No), then the first flow proceeds to block B1550.

Also, from block B1500, the second flow proceeds to block B1545. In block B1545, the image-enhancement device performs edge enhancement on the obtained image. The second flow then moves to block B1550.

In block B1550, the image-enhancement device generate a synthesized image based on the edge-enhanced image and on the second ROI-based revised values of the pixels. Some embodiments of the synthesizing can be described by equation (9).

In block B1555, the image-enhancement device performs dynamic contrast stretching on the synthesized image (the output of block B1550), thereby generating and adjusted-dynamic-range image. In some embodiments (e.g., the embodiment in FIG. 15), the adjusted-dynamic-range image is the enhanced image. Finally, in block B1560, the image-enhancement device outputs or stores the enhanced image (the output of block B1555). Before output or storage, some embodiments scale the pixel values to a different range for display or storage purposes, for example to [0,255]. Additionally, some embodiments of the operational flow use the output of blocks B1505-B1520, the output of blocks B1525-B1540, or the output of block B1550 as the enhanced image.

Figure 16:
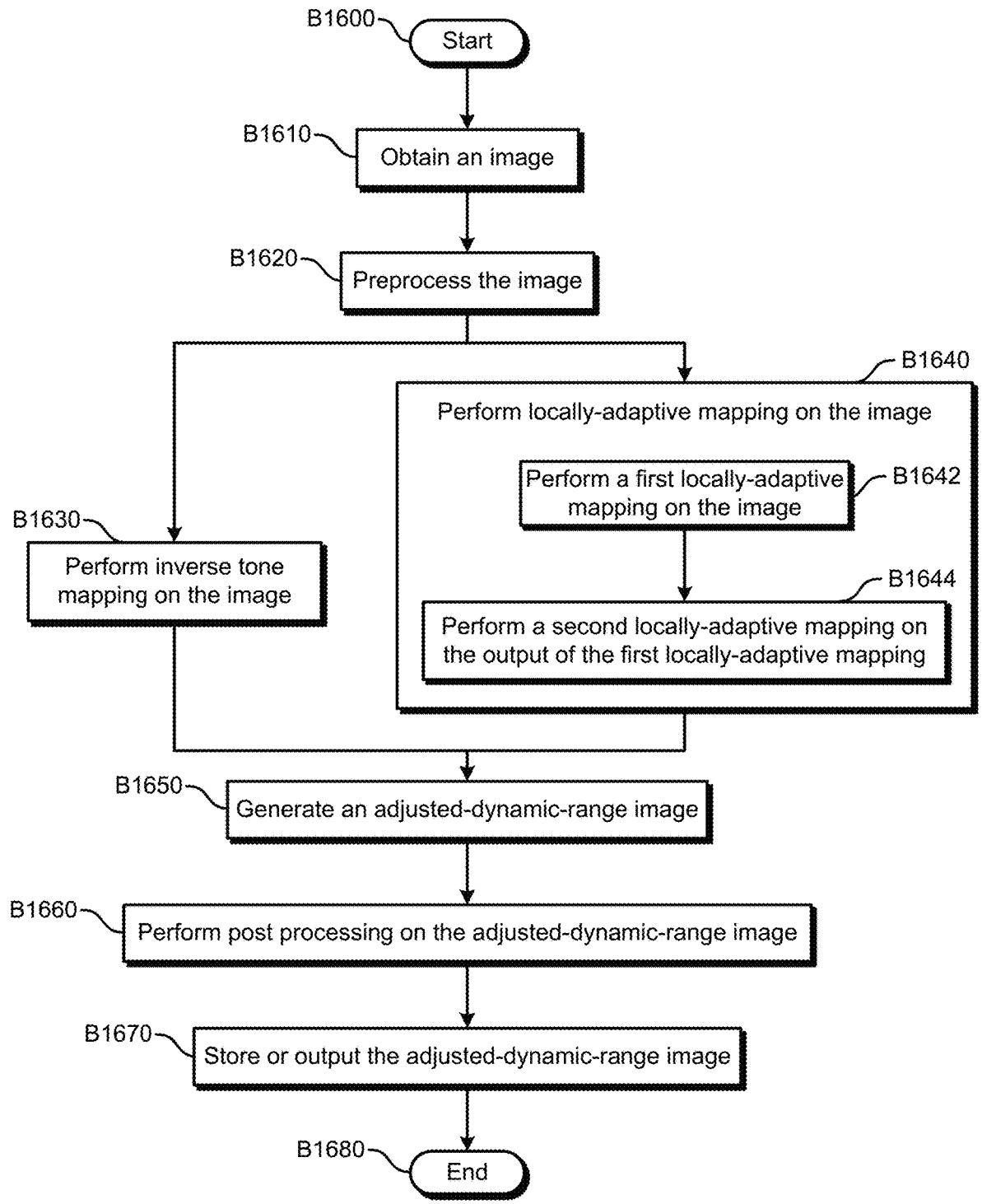
FIG. 16 illustrates an example embodiment of an operational flow for enhancing an image.

FIG. 16 illustrates an example embodiment of an operational flow for enhancing an image. This operational flow performs tone mapping and enhances the dynamic range of the image. Some tone mapping applies a gamma-shaped function to an original image, globally or locally. When applied globally, the gamma-shaped function adjusts the histogram of the whole image by boosting the low-mid tones of the image while compressing mid-high tones to maximize the contrast in the low-mid tone regions. When applied locally (e.g., to better reproduce local contrast), the image may be divided into multiple regions (e.g., based on location, content, intensity level), and then the parameters of the gamma-shaped function may be tuned for the individual region before the gamma-shaped function is applied to the region.

Because the gamma-shaped function compresses high tones in the image, the gamma function may work most effectively for natural-scene images where the background has a higher luminance (e.g., sky, light source) and contains less useful details. Then the dynamic range in the high-luminance region is traded off to enhance contrast and reveal more details in the low-mid tone regions. However, because of different imaging techniques or imaging goals, sometimes both the low-luminance regions and the high-luminance regions in an image contain important details or information. In these situations, some embodiments attempt to preserve details and enhance details or contrast in both the high- and low-luminance regions.

The operational flow in FIG. 16 starts in block B1600, and then, in block B1610, an image-enhancement device obtains an image. In some embodiments, the flow then moves to block B1620, where the image-enhancement device preprocesses the obtained image (the image obtained in block B1610) by scaling the pixel values in the obtained image, for example to [0, 1], which means that the minimal pixel value of the obtained image is set to 0 and the maximal pixel value of the obtained image is set to 1. Any value between is linearly scaled. Additionally, some embodiments of the operational flow omit block B1620. The flow then splits into a first flow and a second flow.

The first flow proceeds to block B1630, where the image-enhancement device performs an inverse tone mapping on the obtained image (e.g., in embodiments that omit block B1620) or the scaled image (the output of block B1620). In some embodiments, the inverse tone mapping can be described by $$I_{high}=1-(1-I_{in})^g, \quad (13)$$

where $I_{in}$ is the image (e.g., the scaled image, the obtained image) that is input to block B1630, where $I_{high}$ is the inverse-tone-mapped image, and where g is a gamma factor that controls the shape of a gamma function. The operation that is described by $(1-I_{in})$ performs an inverse operation on the image, which means high-luminance regions are changed into low-luminance regions. The gamma operation on this inversed image may enhance the contrast of the current low-luminance regions, which are the high-luminance regions in the original image. Then the inverse operation inverses the image back so that relatively high-luminescence regions will be unchanged compared to the original image. And, because the re-inverse operation is linear, the contrast that has been enhanced during the gamma operation will be maintained. So in the inverse-tone-mapped image $I_{high}$, the contrast in the mid-high luminance region is enhanced and more details may be revealed in that region. Also, different gamma factors g can be used for different regions in the image. Additionally, some embodiments use different gamma-shaped operations than the global gamma operations that can be described by equation (13).

Figure 17A:
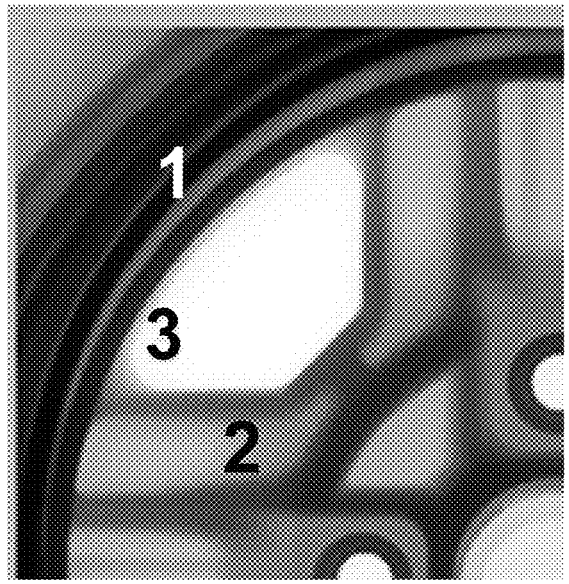
FIGS. 17A-D illustrate examples of the effects of an embodiment of the inverse-tone-mapping operations.
Figure 17B:
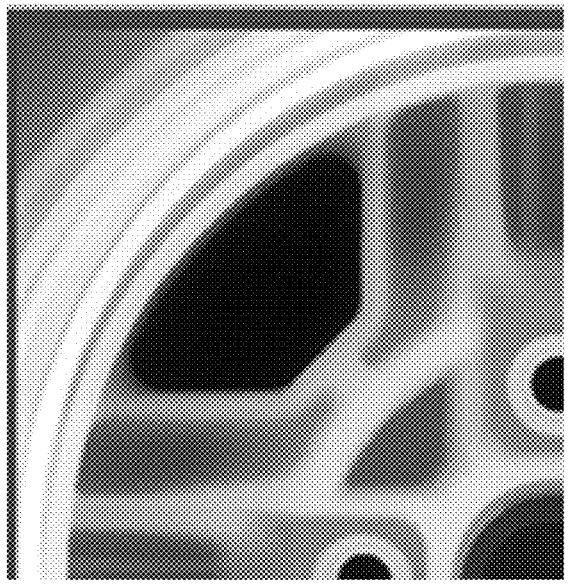
Figure 17C:
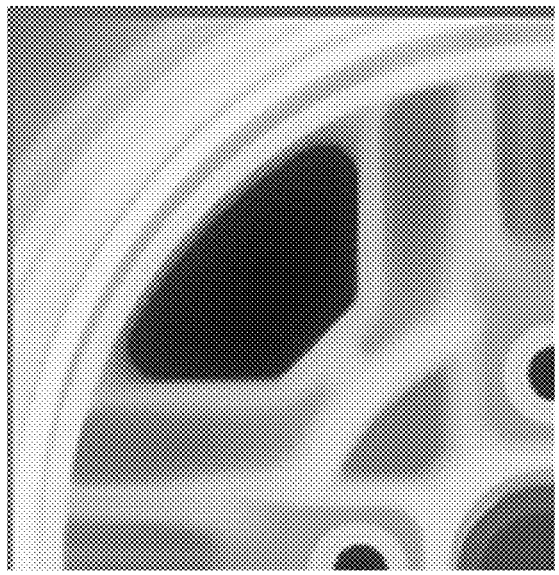
Figure 17D:
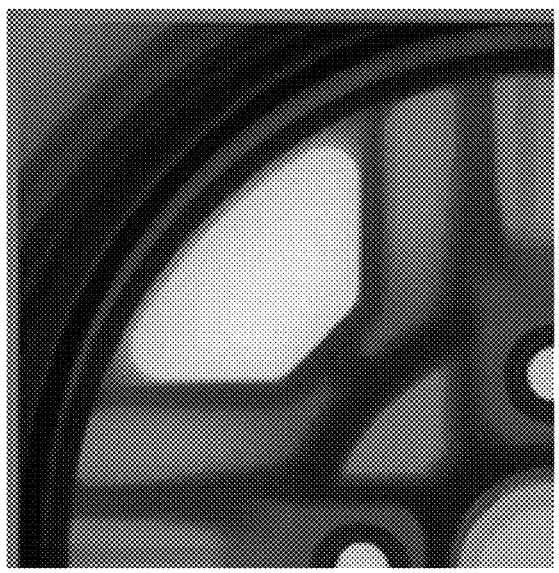

FIGS. 17A-D illustrate examples of the effects of an embodiment of the inverse-tone-mapping operations. In this example, the gamma factor is 0.5 (g=0.5). FIG. 17A shows an original image, where "1" marks some of the low luminance regions, "2" marks some of the mid-luminance regions, and "3" marks some of the high-luminance regions. FIG. 17B shows the inversed image of the original image. FIG. 17C shows the inversed image after gamma-enhancement. And FIG. 17D shows the inverse-tone-mapped image of block B1630, which is the inversed image of FIG. 17C. FIGS. 17A-D show that, after block B1630, the contrast in the mid-high luminance regions, as marked by "2" and "3," has been enhanced, and the details are more visible to human vision.

The first flow then proceeds to block B1650.

From block B1620, the second flow moves to block B1640, where the image-enhancement device performs a local-adaptive mapping on the obtained image (e.g., in embodiments that omit block B1620) or the scaled image (the output of block B1620). Consequently, block B1640 can be performed before or in parallel with block B1630. In some embodiments, the local-adaptive mapping applies twice-adaptive nonlinear local mapping and can be described by equations (1) and (3). For example, in some embodiments, in block B1640 the image-enhancement device performs the operations that are described in blocks B220-B230 in FIG. 2, in blocks B705-B740 in FIG. 7, in blocks B1020-B1030 in FIG. 10, or in blocks B1505-B1540 in FIG. 15. In the embodiment shown in FIG. 16, block B1640 includes performing a first locally-adaptive mapping in block B1642 (e.g., a mapping that can be described by equation (1) or equation (7)) and includes performing a second locally-adaptive mapping in block B1644 (e.g., a mapping that can be described by equation (3) or equation (8)).

Figure 18A:
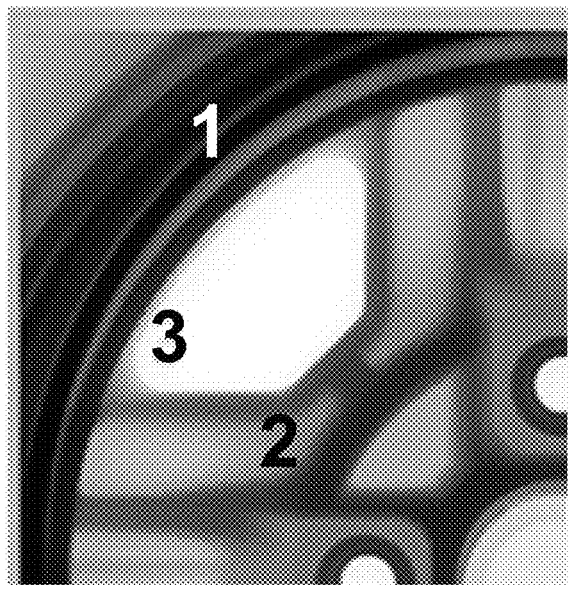
FIGS. 18A-B illustrate an example of the effects of an embodiment of locally-adaptive-mapping operations.
Figure 18B:
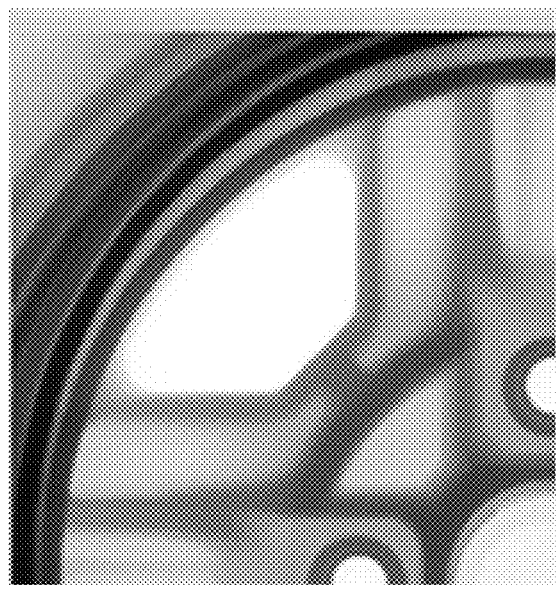

FIGS. 18A-B illustrate an example of the effects of an embodiment of the locally-adaptive-mapping operations. In this example, both α1 and α2 were set to 0.1. FIG. 18A is the original image with low, mid, and high luminance regions marked by "1," "2," and "3," respectively. FIG. 18B shows the image after twice performing locally-adaptive-nonlinear-mapping operations (e.g., as described by equations (1) and (3)). FIGS. 18A-B show that, after block B1640, the dark regions (marked as "1" and "2") in the original image in FIG. 18A have been enhanced and more details (e.g., circular lines) are visible in FIG. 18B.

Also, some embodiments use a locally-adaptive tone mapping operation to produce better local contrast in low-mid tone regions. And some embodiments use other gamma-shaped global tone-mapping operations or locally-adaptive tone-mapping operations.

The flow then moves to block B1650, where the image-enhancement device generates (e.g., reconstructs, synthesizes) an adjusted-dynamic-range image based on the images that are output by blocks B1630 and B1640. After the operations in blocks B1630 and B1640, the image-enhancement device has two images that have different contrast-enhanced regions. The inverse tone mapping in block B1630 enhances contrast or dynamic range in mid-high tone regions, and the mapping in block B1640 enhances contrast or dynamic range in low-mid tone regions. In block B1650, the image-enhancement device generates an adjusted-dynamic-range image based on these two images. In some embodiments, the generation of the an adjusted-dynamic-range image $I_{adr}$ can be described by the following:

$$I_{adr}=\text{normalize}((\beta*I_{high}+(1-\beta)*I_{low}), \quad (14)$$

where $I_{high}$ is the image generated in block B1630, in which the mid-high luminance regions have been contrast enhanced; where $I_{low}$ is the image generated in block B1640, in which the low-mid luminance regions have been contrast enhanced; and where is a factor between 0 and 1 that controls the contrast-enhancement strength for the adjusted-dynamic-range image $I_{adr}$. A smaller β yields an adjusted-dynamic-range image $I_{adr}$ that has more dynamic range in low-mid tone regions and less dynamic range in mid-high tone regions, and a larger yields an adjusted-dynamic-range image $I_{adr}$ that has less dynamic range in low-mid tone regions and more dynamic range in mid-high tone regions. For example, some embodiments use β=0.5. After adding the weighted outputs of blocks B1630-B1640, the adjusted-dynamic-range image $I_{adr}$ may be normalized to [0,1].

With a proper selection of the adjusted-dynamic-range image $I_{adr}$ output in block B1650 has an enhanced dynamic range in mid-high tone regions and in low-mid tone regions. Accordingly, makes the operations in block B1650 tunable, and the strength of the tuning can be different for different regions in the image. In some embodiments, for example, the image can first be segmented into two or more different regions based on the regions' contents or histograms. Different βs are used in different regions to maximize the contrast. At the boundary area between two different regions, β is calculated and used as the weighted average of the βs in the two regions to achieve a smooth transition.

Figure 19A:
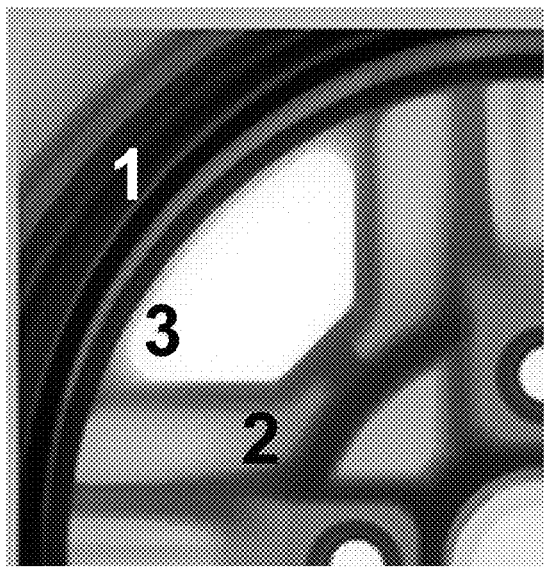
FIGS. 19A-B illustrate an example of a comparison between an original image and a post-processed adjusted-dynamic-range image.
Figure 19B:
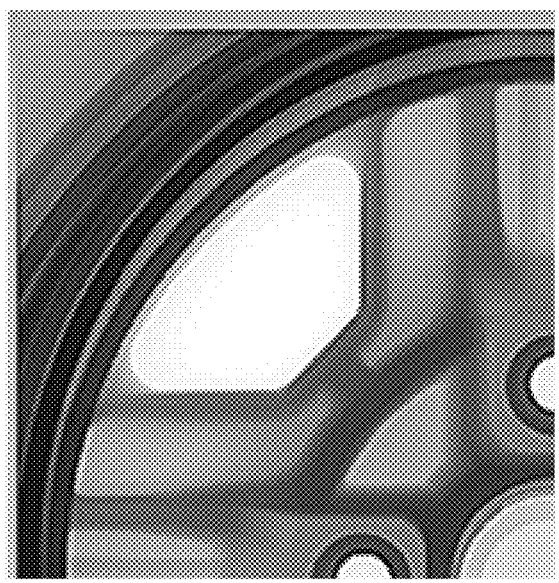

Next, in block B1660, the image-enhancement device performs post processing on the adjusted-dynamic-range image, thereby generating an enhanced image. For example, to further increase the dynamic range for the image and amplify the details, some embodiments perform one or more post-processing operations on the adjusted-dynamic-range image. The post-processing operations may include a convolution with an LOG (Mexican Hat) 2D filter and dynamic contrast stretching (e.g., as described in block B260 in FIG. 2, block B750 in FIG. 7, block B1070 in FIG. 10, and block B1555 in FIG. 15). FIGS. 19A-B illustrate an example of a comparison between an original image (an image obtain in block B1610) and an enhanced image. FIG. 19A shows the original image, and FIG. 19B shows the enhanced image. The contrast has been enhanced in all three luminance regions (marked by 1, 2, and 3). Also, some embodiments omit block B1660.

The flow then moves to block B1670, where the image-enhancement device stores or output the enhanced image. The flow ends in block B1680. Additionally, some embodiments of the operational flow use the output of block B1630, the output of block B1640, or the output of block B1650 as the enhanced image.

Figure 20:
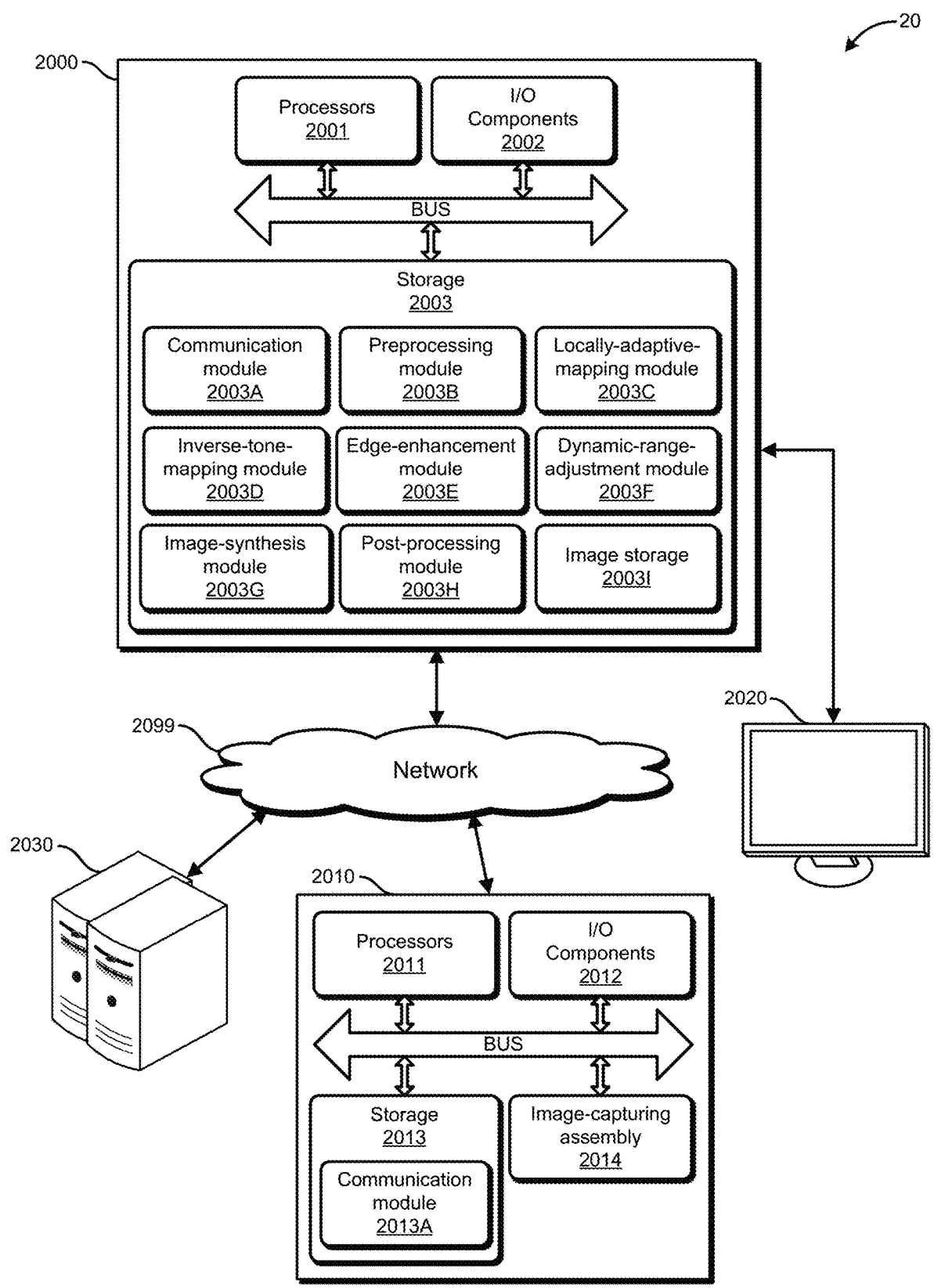
FIG. 20 illustrates an example embodiment of an image-enhancement system.

FIG. 20 illustrates an example embodiment of an image-enhancement system. The system 20 includes an image-enhancement device 2000, which is a specially-configured computing device; an image-capturing device 2010 (e.g., an x-ray-imaging device); a display device 2020; and an image-repository device 2030 (e.g., a file server, a database server). In this embodiment, the image-enhancement device 2000, the image-capturing device 2010, and the image-repository device 2030 communicate via one or more networks 2099, which may include a wired network, a wireless network, a LAN, a WAN, a MAN, and a PAN. Also, in some embodiments of the system 20, the devices communicate via other wired or wireless channels.

The image-enhancement device 2000 includes one or more processors 2001, one or more I/O components 2002, and storage 2003. Also, the hardware components of the image-enhancement device 2000 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 2001 include one or more central processing units (CPUs), which include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 2002 include communication components (e.g., a graphics card, a network-interface controller) that communicate with the image-capturing device 2010, the display device 2020, the image-repository device 2030, the network 2099, and other input or output devices (not illustrated), which may include a keyboard, a mouse, a printing device, a touch screen, a light pen, an optical-storage device, a scanner, a microphone, a drive, and a game controller (e.g., a joystick, a control pad).

The storage 2003 includes one or more computer-readable storage media. As used herein, a computer-readable storage medium, in contrast to a mere transitory, propagating signal per se, refers to a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 2003, which may include either or both ROM and RAM, can store computer-readable data or computer-executable instructions.

The image-enhancement device 2000 also includes a communication module 2003A, a preprocessing module 2003B, a locally-adaptive-mapping module 2003C, an inverse-tone-mapping module 2003D, an edge-enhancement module 2003E, a dynamic-range-adjustment module 2003F, an image-synthesis module 2003G, a post-processing module 2003H, and image storage 20031. A module includes logic, computer-readable data, or computer-executable instructions. In the embodiment shown in FIG. 20, the modules are implemented in software (e.g., Assembly, C, C++, C#, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 2003. Also, in some embodiments, the image-enhancement device 2000 includes additional or fewer modules, the modules are combined into fewer modules, or the modules are divided into more modules.

The communication module 2003A includes instructions that cause the image-enhancement device 2000 to communicate with one or more other devices (e.g., the image-capturing device 2010, the image-repository device 2030), for example to obtain one or more images from the image-capturing device 2010, to obtain one or more images from the image-repository device 2030, to obtain a selection or indication of a region of interest (ROI), to generate one or more user interfaces, or to send one or more images to another device (e.g., the display device 2020). Also for example, some embodiments of the communication module 2003A include instructions that cause the image-enhancement device 2000 to perform at least some of the operations that are described in blocks B200 and B260 in FIG. 2, in blocks B700 and B755 in FIG. 7, in blocks B1000 and B1080 in FIG. 10, in blocks B1500 and B1560 in FIG. 15, and in blocks B1610 and B1670 in FIG. 16. Additionally, for example, some embodiments of the communication module 2003A include instructions that cause the image-enhancement device 2000 to generate the embodiment of a user interface that is illustrated in FIG. 5, the embodiment of a user interface that is illustrated in FIG. 6, the embodiment of a user interface that is illustrated in FIG. 8, or the embodiment of a user interface that is illustrated in FIG. 9.

The preprocessing module 2003B includes instructions that cause the image-enhancement device 2000 to perform preprocessing operations (e.g., normalizing operations) on one or more images. For example, some embodiments of the preprocessing module 2003B include instructions that cause the image-enhancement device 2000 to perform at least some of the operations that are described in block B210 in FIG. 2, in block B1010 in FIG. 10, and in block B1620 in FIG. 16.

The locally-adaptive-mapping module 2003C includes instructions that cause the image-enhancement device 2000 to perform at least one locally-adaptive mapping (e.g., a first locally-adaptive mapping, a second locally-adaptive mapping, a first ROI-based locally-adaptive mapping, a second ROI-based locally-adaptive mapping) on one or more images, for example as described in blocks B220-B230 in FIG. 2, in blocks B705-B740 in FIG. 7, in blocks B1020-B1030 in FIG. 10, in blocks B1505-1540 in FIG. 15, or in block B1640 in FIG. 16.

The inverse-tone-mapping module 2003D includes instructions that cause the image-enhancement device 2000 to perform an inverse tone mapping on one or more images, for example as described in block B1630 in FIG. 16.

The edge-enhancement module 2003E includes instructions that cause the image-enhancement device 2000 to enhance the edges in one or more images, for example as described in block B240 in FIG. 2, in block B745 in FIG. 7, in block B1040 in FIG. 10, or in block B1545 in FIG. 15.

The dynamic-range-adjustment module 2003F includes instructions that cause the image-enhancement device 2000 to generate one or more adjusted-dynamic-range images, for example by performing dynamic contrast stretching on one or more images. Also for example, some embodiments of the preprocessing module 2003B include instructions that cause the image-enhancement device 2000 to perform at least some of the operations that are described in block B250 in FIG. 2, in block B750 in FIG. 7, in block B1070 in FIG. 10, in block B1555 in FIG. 15, and in block B1650 in FIG. 16.

The image-synthesis module 2003G includes instructions that cause the image-enhancement device 2000 to generate an image based on two or more images, for example by synthesizing two or more images. Also for example, some embodiments of the image-synthesis module 2003G include instructions that cause the image-enhancement device 2000 to perform at least some of the operations that are described in block B1060 in FIG. 10, in block B1550 in FIG. 15, and in block B1650 in FIG. 16.

The post-processing module 2003H includes instructions that cause the image-enhancement device 2000 to perform post processing on one or more images, for example as described in block B1660 in FIG. 16.

The image storage 20031 is a repository that stores one or more images, for example the images that are obtained or generated by the operations in FIG. 2, FIG. 7, FIG. 10, FIG. 15, and FIG. 16.

The image-capturing device 2010 includes one or more processors 2011, one or more I/O components 2012, storage 2013, a communication module 2013A, and an image-capturing assembly 2014. The image-capturing assembly 2014 includes one or more image sensors and may include one or more lenses and an aperture. The communication module 2013A includes instructions that, when executed, or circuits that, when activated, cause the image-capturing device 2010 to capture an image, receive a request for an image from a requesting device, retrieve a requested image from the storage 2013, or send a retrieved image to the requesting device (e.g., the image-enhancement device 2000).

Also, in some embodiments, the image-enhancement device 2000 includes the image-capturing assembly 2014.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:

1. A method comprising:
   obtaining an initial image that is defined in an image space;
   performing, in the image space, at least one nonlinear locally-adaptive mapping on the initial image, thereby generating a revised image in the image space, wherein the at least one nonlinear locally-adaptive mapping on the initial image includes a first nonlinear locally-adaptive mapping on the initial image in the image space that generates a first revised value for pixel p in the initial image based on the following: a value of pixel p in the initial image, respective values of pixels in a neighborhood of pixel p in the initial image, a maximum value of respective values of all pixels in the initial image, and a central tendency of the respective values of all the pixels in the initial image;
   performing, in the image space, edge enhancement on the initial image, thereby generating an edge-enhanced image in the image space;
   generating a synthesized image based on the edge-enhanced image and on the revised image; and
   performing, in the image space, dynamic contrast stretching on the revised image in the image space, thereby generating an enhanced image in the image space.

2. The method of claim 1, wherein performing at least one nonlinear locally-adaptive mapping on the initial image includes:
   performing a first nonlinear locally-adaptive mapping on the initial image, thereby generating an interim image in the image space; and
   performing a second nonlinear locally-adaptive mapping on the interim image, thereby generating the revised image in the image space.

3. The method of claim 2, wherein an output pixel value of the first nonlinear locally-adaptive mapping on the initial image can be described by the following:

$$y_{temp} = (\max(I_{in}) + f + a1)\frac{x}{x + f + a1},$$

$$\text{where } f = LP(x) + \frac{\text{mean}(I_{in})}{2},$$

where $y_{temp}$ is the output pixel value of the first nonlinear locally-adaptive mapping, where $I_{in}$ is the initial image, where x is a pixel value in the initial image $I_{in}$, where $\max(I_{in})$ is a maximum pixel value in the initial image $I_{in}$, where a1 is a strength-control parameter, where $\text{mean}(I_{in})$ is a central tendency of all pixel values in the initial image $I_{in}$, and where $LP(x)$ is a value at the pixel after the initial image $I_{in}$ has been convolved with a low-pass filter.

4. The method of claim 3, wherein an output pixel value of the second nonlinear locally-adaptive mapping on the interim image can be described by the following:

$$y_{out} = (\max(Y_{temp}) + h + a2)\frac{y_{temp}}{y_{temp} + h + a2},$$

$$\text{where } h = LP(y_{temp}) + \frac{\text{mean}(Y_{temp})}{2},$$

where $y_{out}$ is the output pixel value of the second nonlinear locally-adaptive mapping, where $K_{temp}$ is the interim image, where $\max(Y_{temp})$ is the maximum pixel value in the interim image, where $\text{mean}(Y_{temp})$ is a central tendency of all pixel values in the interim image, where a2 is a strength-control parameter, and where $LP(y_{temp})$ is a value at pixel x after the interim image $K_{temp}$ has been convolved with a low-pass filter.

5. The method of claim 1, further comprising:
   obtaining an indication of a region of interest in the initial image,
   wherein the at least one nonlinear locally-adaptive mapping on the initial image includes a region-of-interest-based nonlinear locally-adaptive mapping.

6. The method of claim 5, wherein an output pixel value of the region-of-interest-based nonlinear locally-adaptive mapping on the initial image can be described by the following:

$$y_{temp} = (\max(I_{in}) + f + a1)\frac{x}{x + f + a1},$$

$$\text{where } f = LP(x) + \text{mean}(I_{ROI}),$$

where $y_{temp}$ is the output pixel value of the region-of-interest-based nonlinear locally-adaptive mapping, where $I_{in}$ is the initial image, where x is an input pixel value, where $\max(I_{in})$ is a maximum pixel value in the initial image, where a1 is a strength-control parameter, where $\text{mean}(I_{ROI})$ is a central tendency of all pixel values in the region of interest in the initial image, and where $LP(x)$ is a value at the pixel after the initial image has been convolved with a low-pass filter.

7. The method of claim 1, wherein the at least one nonlinear locally-adaptive mapping
   maps pixel values in the initial image to respective pixel values in the revised image, wherein each pixel value in the initial image maps to a respective pixel value in the revised image; and
   maps two pixel values in the initial image that are identical and that have different neighborhood pixel values to two different respective pixel values in the revised image.

8. The method of claim 7,
   wherein a highest pixel value in the initial image is equal to a highest pixel value in the revised image, and wherein a lowest pixel value in the initial image is equal to a lowest pixel value in the revised image.

9. The method of claim 1, wherein performing the at least one nonlinear locally-adaptive mapping on the initial image includes:
   generating a respective scaling factor for each pixel in the initial image, wherein each pixel's respective scaling factor is based, at least in part, on the maximum value of the respective values of all pixels a maximum pixel value in the initial image and on respective pixel values of pixels in a neighborhood of the pixel, and multiplying each pixel's respective value by the pixel's respective scaling factor.

10. The method of claim 9, wherein each pixel's respective scaling factor is further based, at least in part, on the pixel's value in the initial image.

11. A device comprising:
one or more computer-readable media storing instructions; and
one or more processors that are configured to communicate with the one or more computer-readable media to execute the instructions to cause the device to perform operations comprising:
obtaining an image that is defined in an image space;
performing, in the image space, one or more nonlinear locally-adaptive mappings on the image, thereby generating a revised image in the image space, wherein performing the one or more nonlinear locally-adaptive mappings on the image includes generating a respective scaling factor for each pixel in the image and multiplying each pixel's respective value by the pixel's respective scaling factor;
performing an inverse tone mapping on the image, thereby generating an inverse-tone-mapped image;
generating an adjusted-dynamic-range image in the image space based on the revised image in the image space and on the inverse-tone-mapped image;
synthesizing the revised image and the adjusted-dynamic-range image, thereby generating a synthesized image; and
performing dynamic contrast stretching on the synthesized image.

12. The device of claim 11, wherein the operations further comprise:
enhancing one or more edges in the image, thereby generating an edge- enhanced image, and
wherein generating the adjusted-dynamic-range image is further based on the edge-enhanced image.

13. The device of claim 11, wherein the synthesized image includes pixels that have respective values, and
wherein performing the dynamic contrast stretching on the synthesized image includes:
obtaining a first value and a second value, wherein the first value is less than the second value, and
modifying the respective values of the pixels in the synthesized image such that a first percentage of the pixels in the synthesized image have respective values that are lower than the first value and such that a second percentage of the pixels in the synthesized image have respective values that are lower than the second value.

14. The device of claim 11, wherein the operations further comprise:
obtaining an indication of a region of interest in the image, and
wherein the one or more nonlinear locally-adaptive mappings include at least one region-of-interest-based nonlinear locally-adaptive mapping.

15. One or more non-transitory computer-readable media storing instructions that, when executed by one or more computing devices, cause the one or more computing devices to perform operations comprising:
obtaining an image that is defined in an image space;
performing, in the image space, a first nonlinear locally-adaptive mapping on the image, thereby generating an interim image in the image space, wherein performing the first nonlinear locally-adaptive mapping on the image includes generating a respective scaling factor for each pixel in the image and multiplying each pixel's respective value by the pixel's respective scaling factor;
performing, in the image space, a second nonlinear locally-adaptive mapping on the interim image in the image space, thereby generating a revised image;
enhancing one or more edges in the image, thereby generating an edge- enhanced image; and
generating a synthesized image based on the edge-enhanced image and on the revised image,
wherein an output pixel value of the first nonlinear locally-adaptive mapping on the image can be described by the following:

$$y_{temp} = (\max(I_{in}) + f + a1)\frac{x}{x + f + a1},$$

$$\text{where } f = LP(x) + \frac{\text{mean}(I_{in})}{2},$$

where $y_{temp}$ is the output pixel value of the first nonlinear locally-adaptive mapping, where $I_{in}$ is the image, where x is a pixel value in the image $I_{in}$, where $\max(I_{in})$ is a maximum pixel value in the image, where a1 is a strength-control parameter, where $\text{mean}(I_{in})$ is a central tendency of all pixel values in the image, and where LP(x) is a value at the pixel after the image has been convolved with a low-pass filter.

16. The one or more non-transitory computer-readable media of claim 15, wherein an output pixel value of the second nonlinear locally-adaptive mapping on the interim image can be described by the following:

$$y_{out} = (\max(Y_{temp}) + h + a2)\frac{y_{temp}}{y_{temp} + h + a2},$$

$$\text{where } h = LP(y_{temp}) + \frac{\text{mean}(Y_{temp})}{2},$$

where $y_{out}$ is the output pixel value of the second nonlinear locally-adaptive mapping, where $y_{temp}$ is the interim image, where $\max(Y_{temp})$ is the maximum pixel value in the interim image, where $\text{mean}(Y_{temp})$ is a central tendency of all pixel values in the interim image, where a2 is a strength-control parameter, and where $LP(y_{temp})$ is a value at pixel x after the interim image $Y_{temp}$ has been convolved with a low-pass filter.

17. The one or more non-transitory computer-readable media of claim 15, wherein the operations further comprise:
performing dynamic contrast stretching on the synthesized image, thereby generating an adjusted-dynamic-range image.

18. The one or more non-transitory computer-readable media of claim 15, wherein the operations further comprise:
performing an inverse tone mapping on the image, thereby generating an inverse-tone-mapped image, and
generating an adjusted-dynamic-range image based on the inverse-tone-mapped image and on the revised image.

* * * * *